US011383789B2

(12) United States Patent
Menichetti

(10) Patent No.: US 11,383,789 B2
(45) Date of Patent: Jul. 12, 2022

(54) VARIABLE SPEED DRIVE, A DRIVE DEVICE FOR AN ASSISTED-PEDAL HUMAN-POWERED VEHICLE AND A VEHICLE COMPRISING SAID DEVICE

(71) Applicant: Paolo Menichetti, Santa Maria a Colle (IT)

(72) Inventor: Paolo Menichetti, Santa Maria a Colle (IT)

( * ) Notice: Subject to any disclaimer, the term of this patent is extended or adjusted under 35 U.S.C. 154(b) by 352 days.

(21) Appl. No.: 16/637,617

(22) PCT Filed: Aug. 6, 2018

(86) PCT No.: PCT/IB2018/055895
§ 371 (c)(1),
(2) Date: Feb. 7, 2020

(87) PCT Pub. No.: WO2019/030642
PCT Pub. Date: Feb. 14, 2019

(65) Prior Publication Data
US 2020/0255087 A1 Aug. 13, 2020

(30) Foreign Application Priority Data
Aug. 9, 2017 (IT) .......................... 102017000092319

(51) Int. Cl.
*B62M 6/45* (2010.01)
*B62M 6/55* (2010.01)
(Continued)

(52) U.S. Cl.
CPC ................ *B62M 6/45* (2013.01); *B62M 6/55* (2013.01); *B62M 11/08* (2013.01); *F16H 15/08* (2013.01); *F16H 61/664* (2013.01)

(58) Field of Classification Search
CPC . B62M 6/40; B62M 6/45; B62M 6/55; B62M 11/08; B62M 11/12; F16H 15/08; F16H 15/12; F16H 15/42; F16H 61/664
See application file for complete search history.

(56) References Cited

U.S. PATENT DOCUMENTS 2,815,670 A * 12/1957 Jorgensen ............... F16H 15/14
476/47
11,014,627 B2 * 5/2021 Hawkins ................. B62M 6/90
(Continued)

FOREIGN PATENT DOCUMENTS

| EP | 0366848 | * | 1/1988 | ............. F16H 15/14 |
| JP | 4-15348 | * | 1/1992 | ............. F16H 15/06 |

(Continued)

*Primary Examiner* — Anne Marie M Boehler
(74) *Attorney, Agent, or Firm* — McGlew and Tuttle, P.C.

(57) ABSTRACT

A variable speed drive (37) is described, comprising: a ring (60) adapted to rotate about a first rotation axis; two coaxial disks (73), rigidly connected to each other, adapted to rotate about a second rotation axis (B-B) parallel to the first rotation axis; wherein the ring (60) is at least partially housed between the two coaxial disks (73); a plurality of driving members (75), carried by the ring (60) and arranged according to a circular arrangement coaxial to the ring (60); said driving members are arranged and configured to cooperate with opposite surfaces (73A) of the two coaxial disks (73), transmitting a rotation motion from the ring (60) to the two coaxial disks (73); a device for adjusting the distance between the first rotation axis and the second rotation axis. A drive device (17) of an assisted-pedal human-powered vehicle (10) which includes such a drive is also described.

22 Claims, 16 Drawing Sheets

(51) Int. Cl.
*B62M 11/06* (2006.01)
*F16H 15/08* (2006.01)
*F16H 61/664* (2006.01)

(56) References Cited

U.S. PATENT DOCUMENTS

| | | |
|---|---|---|
| 2011/0180341 A1 | 7/2011 | Chan |
| 2016/0040763 A1 | 2/2016 | Nichols et al. |
| 2016/0176474 A1 | 6/2016 | Wu |
| 2019/0368579 A1* | 12/2019 | Menichetti ............. F16H 63/16 |

FOREIGN PATENT DOCUMENTS

| | | | |
|---|---|---|---|
| WO | 94/21940 A1 | 9/1994 | |
| WO | 2014/172422 A1 | 10/2014 | |
| WO | 2016/067199 A1 | 5/2016 | |
| WO | WO-2016178423 A1 * | 11/2016 | ............. F16H 15/14 |

\* cited by examiner

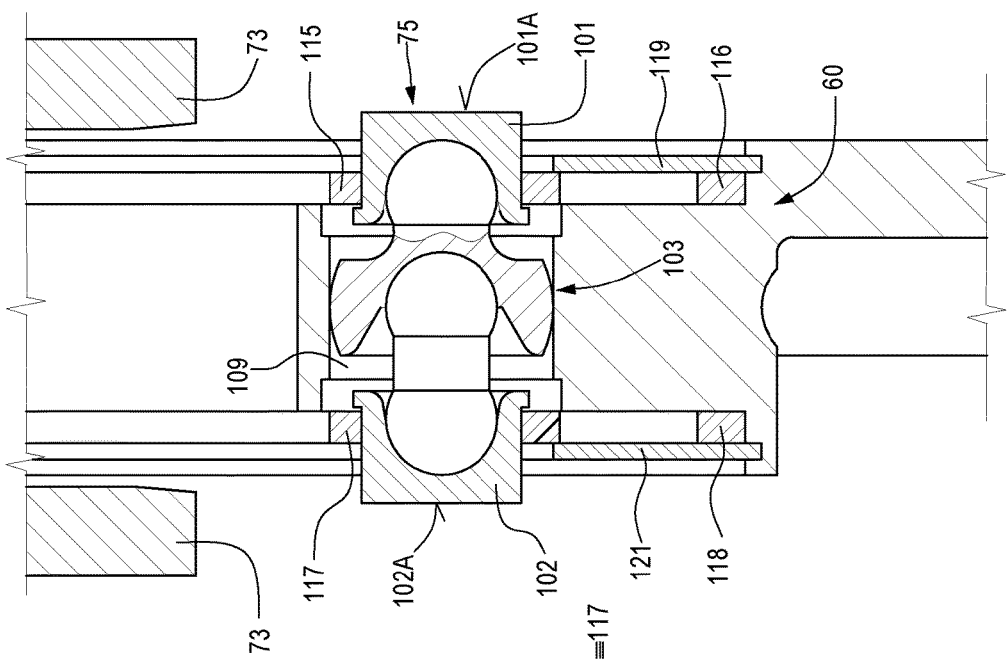
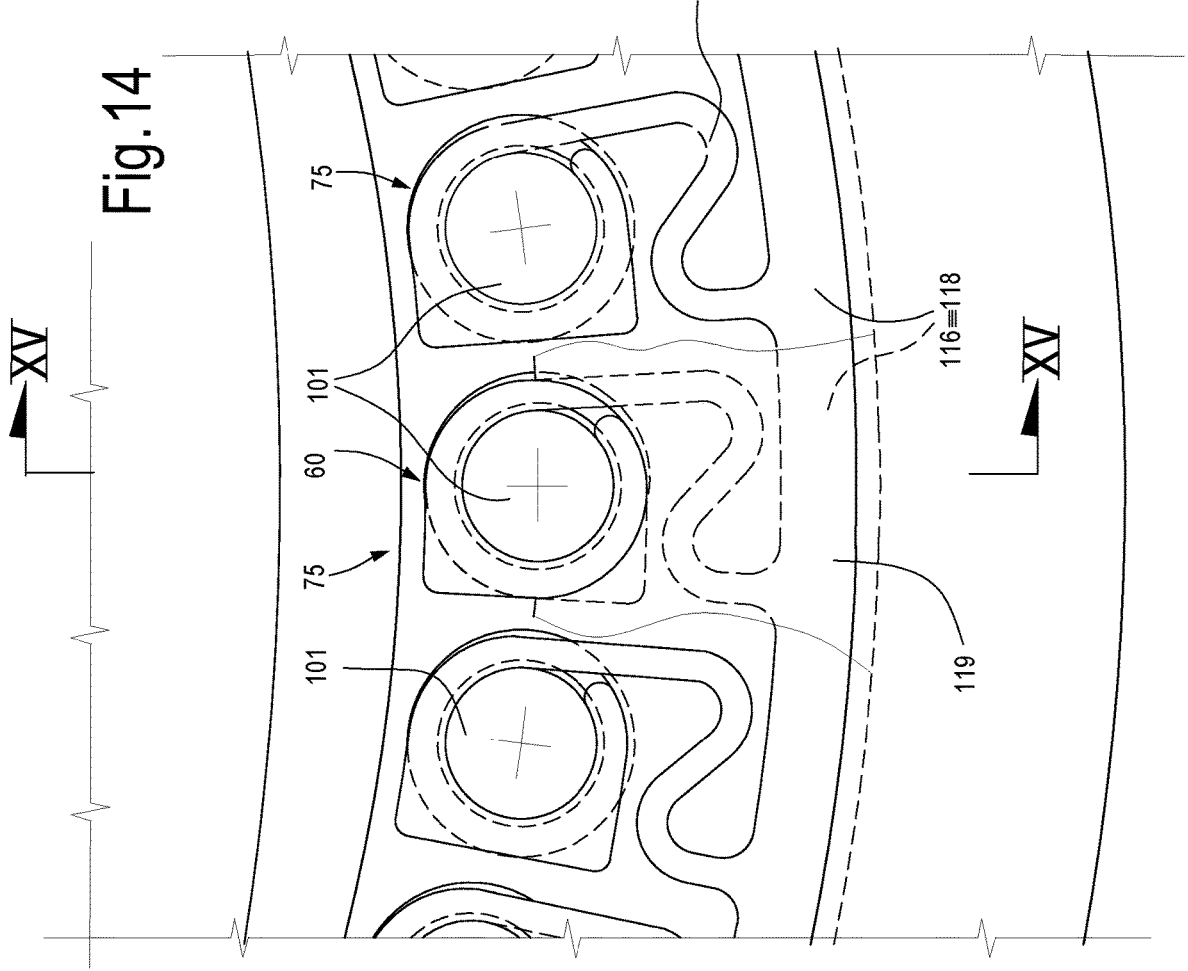

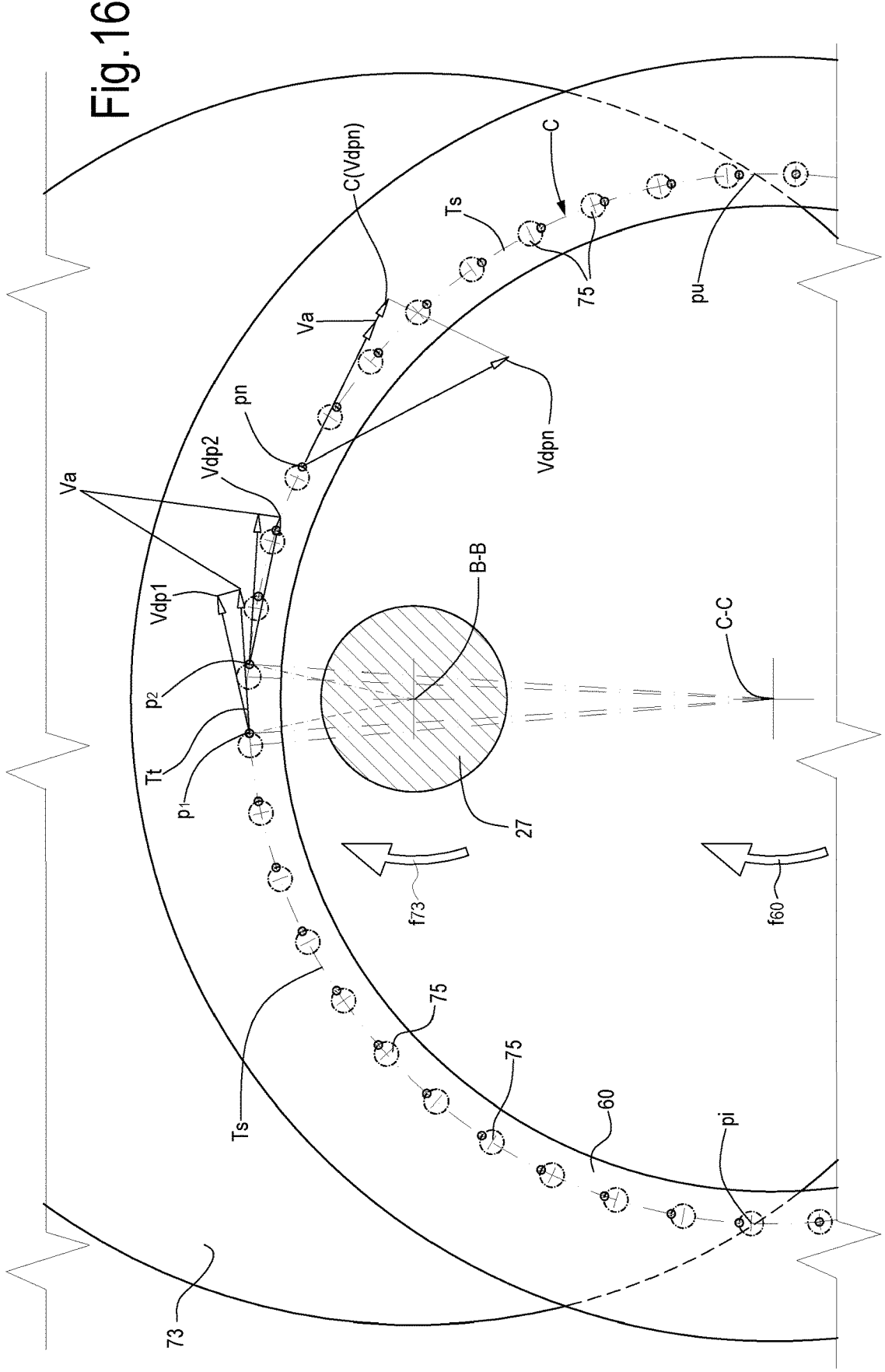

VARIABLE SPEED DRIVE, A DRIVE DEVICE FOR AN ASSISTED-PEDAL HUMAN-POWERED VEHICLE AND A VEHICLE COMPRISING SAID DEVICE

TECHNICAL FIELD

The present invention relates to a variable speed drive, in particular a continuous variable speed drive, as well as a drive device for an assisted-pedal human-powered vehicle, for example a bicycle, a tricycle or an assisted-pedal quadricycle, using such a variable speed drive. The invention also relates to an assisted-pedal vehicle comprising said drive device.

BACKGROUND ART

Due to the increasing cost of fuels, environmental pollution problems and consequent traffic restrictions, especially in urban areas, and as a consequence of the worsening traffic conditions, the use of human-powered vehicles assisted by an electric motor is increasingly widespread. In particular, the so-called assisted-pedal bikes are increasingly popular, where the traditional pedal movement is combined with an electric drive system, which provides at least part of the power required to move the vehicle.

Many devices or groups have been studied that integrate an electric motor unit and a bottom bracket with pedals and pin to combine human propulsion with electric propulsion. Examples of such groups and related pedal-assisted vehicles are described for example in WO 2016/067199, US 2016/0040763, WO94/21940, WO2014/172422, US2011/0180341; US2016/0176474.

Known devices are often complex and cumbersome. There is therefore the need to provide a simpler variable speed drive, of lower cost and smaller in size, particularly adapted to be used in an assisted-pedal device or, more generally, in an assisted-pedal human-powered device, for vehicles such as bicycles or other assisted human-powered vehicle.

SUMMARY OF THE INVENTION

According to an aspect, a variable speed drive is disclosed, in particular a continuous variable speed drive, comprising a ring adapted to rotate around a first rotation axis and two coaxial disks, rigidly connected to each other, adapted to rotate around a second rotation axis parallel to the first rotation axis. The ring is at least partially housed between the two coaxial disks. The variable speed drive further comprises a plurality of driving members, carried by the ring and arranged along a circumference coaxial to the ring. The driving members are arranged and configured to co-act with opposite surfaces of the two coaxial disks, transmitting a rotation motion from the ring to the two coaxial disks. A device is also provided for adjusting the distance between the first rotation axis and the second rotation axis, i.e. essentially for adjusting the eccentricity between the first rotation axis and the second rotation axis. It will be clearer from the following detailed description of embodiments that by varying the distance between the first rotation axis and the second rotation axis, the transmission ratio between the ring and the coaxial disks changes.

The variable speed drive may be arranged between a drive member and a driven member, for example by connecting the drive member to the ring and the driven member to either or both coaxial disks. In this way, by varying the distance between the first rotation axis and the second rotation axis, the transmission ratio between the driving member and the driven member can be continuously modified.

The variable speed drive can be used with particular advantage in a drive device for a pedal-assisted vehicle, typically a pedal-assisted bicycle. However, the possibility of other uses of the variable speed drive defined above is not excluded.

In some embodiments, each driving member carried by the ring and co-acting with the two coaxial disks may comprise two contact and sliding elements for contacting the opposite surfaces of the two coaxial disks and sliding thereon, and an intermediate mechanical connection between the two contact and sliding elements.

In some embodiments, the ring is rotatably supported in a supporting frame movable in a plane orthogonal to the first rotation axis and to the second rotation axis. In this way, the movement of the supporting frame causes a variation in the distance between the first rotation axis and the second rotation axis. In some embodiments, the frame may be provided with a translation movement. In other embodiments, which are constructively more advantageous, the supporting frame is hinged about a pivoting axis, parallel to the first rotation axis and to the second rotation axis. The rotation of the frame around the pivoting axis causes the variation of the distance between the first rotation axis and the second rotation axis and therefore the variation of the transmission ratio between a driving member and a driven member, connected to the ring and to the coaxial disks, or vice versa.

The device for adjusting the distance between the first rotation axis and the second rotation axis may in this case be configured to move the supporting frame with respect to the second rotation axis.

In advantageous embodiments, the supporting frame may be connected to a nut, engaged to a threaded bar, the rotation whereof causes the supporting frame to move, for example to rotate by determined angles about the pivoting axis.

According to a further aspect, a drive device for an assisted human-powered vehicle is provided, comprising a bottom bracket, with a pin on which cranks, levers or other members for transmitting the muscle force of a user are fitted, configured to transmit the motion to a driving sprocket, coaxial with the pin of the bottom bracket. The device further comprises a mechanical power source and a variable speed drive as defined above. A first mechanical transmission is arranged between the mechanical power source and the variable speed drive ring and a second mechanical transmission is arranged between the variable speed drive and the driving sprocket.

The mechanical power source may be an electric motor, which transforms the electrical power supplied, for example, by a battery pack into mechanical power.

The mechanical power supplied by the mechanical power source may be used to reduce or replace the muscle power applied by the vehicle user to facilitate vehicle advancement.

By means of the first mechanical transmission and the variable speed drive, the mechanical power source, for example the electric motor, rotates the variable speed drive ring and the latter transmits the rotation motion, with a variable transmission ratio, to the coaxial disks and, via the second mechanical transmission, to the driving sprocket. Here, the mechanical power supplied by the mechanical power source combines with or replaces the applied muscle power of the user.

The movement generated by the muscle power may be imparted through a system of pedals and pedal cranks, or by means of levers, handles or grips, or other, depending on the structure of the vehicle on which the device is mounted. In fact, the device described may be particularly useful in combination with an assisted-pedal bicycle or other assisted-pedal operated vehicle, on which the user acts through the lower limbs. However, other systems are known for delivering muscle power to a human-powered vehicle, for example pivoting rather than rotary mechanisms, and also mechanisms operable through the upper limbs (arms and hands) rather than through the lower limbs, thus provided with levers and handles, instead of cranks and pedals.

In order to combine the movement imparted by the user (muscle power) with the movement imparted by the mechanical power source, a coaxial free wheel system may be provided, arranged in such a way that the motion to the driving sprocket is transmitted alternately or in combination by the pedals (or other mechanism for transmitting muscle power) and/or by the mechanical power source, depending on the speed with which the drive shaft of the mechanical power source or the bottom bracket pin driven by the muscle force move. In most operating conditions, the movement imparted to the driving sprocket is the sum of the motions of the center pin and of the power source, for example the electric motor. In the sum there may be the predominance of the torque applied by the user and generated by the muscle force, or the torque generated by the mechanical power source (electric motor or other), respectively.

In possible embodiments, a first free wheel, coaxial with the pin of the bottom bracket, is arranged between the pin of the bottom bracket and the driving sprocket. Moreover, the second mechanical transmission may comprise a second free wheel coaxial and external to the first free wheel.

In advantageous embodiments, in order to obtain a compact arrangement with a limited number of components, the mechanical power source is positioned coaxially with the two coaxial disks of the variable speed drive. For example, when the mechanical power source is an electric motor, the rotor and stator of the electric motor may be mounted coaxially to the two coaxial disks of the variable speed drive.

The bottom bracket pin may extend coaxially through the two coaxial disks of the variable speed drive and through the rotor and stator of the electric motor, or other mechanical power source.

In some embodiments, when the mechanical power source comprises an electric motor, the rotor of the electric motor may be internal to the stator and may be suitably coupled torsionally to a first toothed wheel, through which the mechanical power generated by the electric motor is transmitted to the driving sprocket through the first mechanical transmission, the variable speed drive and the second mechanical transmission. More generally, the first toothed wheel may be torsionally coupled to a rotating member of the mechanical power source.

For example, the first toothed wheel may be torsionally coupled to a hollow drive shaft, in turn torsionally coupled to the rotor of the electric motor or in general to a rotating member of the mechanical power source. The bottom bracket pin may be conveniently arranged coaxially with the hollow shaft and internally thereto.

In some embodiments, the second mechanical transmission comprises an epicyclic gear train, to reduce the rotation speed appropriately. The epicyclic gear train may be conveniently arranged between the two coaxial disks of the variable speed drive and the driving sprocket, with an optional free wheel interposed between the driven member of the epicyclic gear train and the driving sprocket. The transmission ratio of the epicyclic gear train may vary according to specific applications. By way of a mere exemplifying and non-limiting example, in the case of conventional bicycles, the transmission ratio may be such as to reduce the rotation speed, e.g. by a ratio of 0.01 to 0.03. For other applications, for example for vehicles with very small wheels, such as wheelchair vehicles, the transmission ratio of the epicyclic gear train may also be significantly different from the one mentioned above.

The planet carrier of the epicyclic gear train may consist of one or the other of the coaxial disks.

According to yet another aspect, an assisted-pedal human-powered vehicle is described, for example but not exclusively an assisted-pedal bicycle, comprising a device as defined above and a member for transmitting motion from the driving sprocket to a vehicle wheel.

BRIEF DESCRIPTION OF THE DRAWINGS

The invention will be better understood by following the description and the accompanying drawings, which illustrate an exemplifying and non-limiting embodiment of the invention. More particularly, in the drawings:

FIG. 10A is a section according to line $X_A$-$X_A$ in FIG. 10;

FIG. 14 is an enlargement of a portion of FIG. 9;

FIG. 15 is a section according to line XV-XV in FIG. 14;

FIGS. 16 and 17 are diagrams showing the operating principle of the variable speed drive;

DETAILED DESCRIPTION OF EMBODIMENTS

Figure 1:
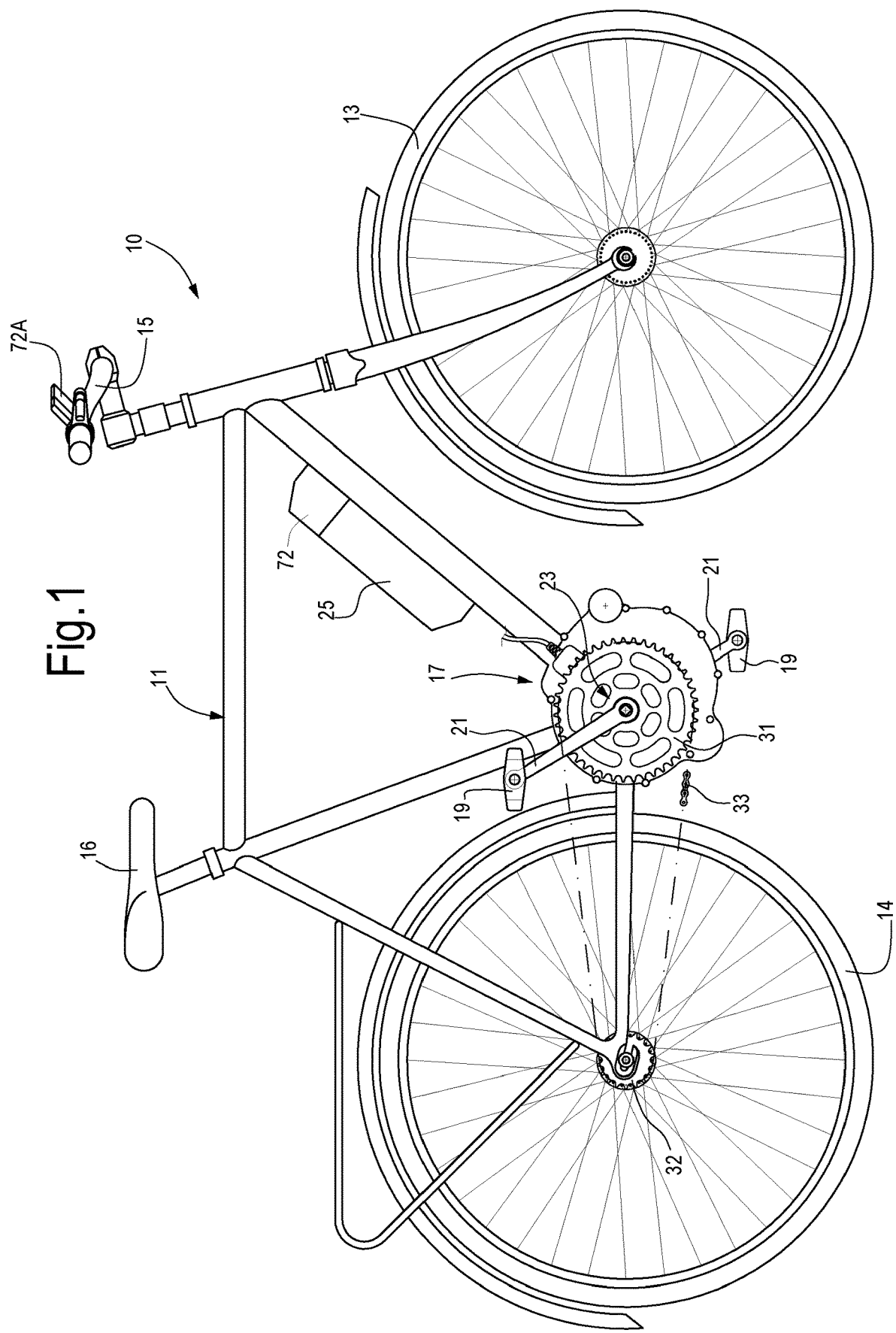
FIG. 1 is a side view of an assisted-pedal bicycle.

The following detailed description of exemplary embodiments refers to the accompanying drawings. Same reference numerals in different drawings identify the same or similar elements. Also, the drawings are not necessarily to scale. The following detailed description does not limit the invention. Rather, the scope of the invention is defined by the appended claims.

The reference throughout the specification to "one embodiment" or "the embodiment" or "some embodiments" means that a particular feature, structure or element described in relation to an embodiment is included in at least one embodiment of the object described. Therefore, the phrase "in one embodiment" or "in the embodiment" or "in some embodiments" in the description does not necessarily refer to the same embodiment or to the same embodiments. Furthermore, the particular features, structures or elements may be combined in any suitable manner in one or more embodiments.

In the following description, reference will be made to a device for driving an assisted-pedal bicycle. It should however be understood that the disclosed device may also be used in other types of human-powered vehicles.

In the present description and in the appended claims, by "assisted-pedal human-powered vehicle" it is generally meant any vehicle which includes a mechanism, for example with pedals, levers, handles, grips or other, suitable for imparting motion to the vehicle through parts of the human body (for example, legs or arms), which is associated with a device for supplying mechanical power generated by a mechanical power source which replaces, integrates or combines with the power generated by the muscle force of the vehicle user.

In the following description, the mechanical power source consists of an electric motor with a stator and a rotor. In the current state of technological development, electric motors represent a suitable mechanical power source for this use. However, the scope of the description and claims is not limited to this mechanical power source. Instead of an electric motor, a different mechanical power source may also be used, which may have a rotary element associated with a drive shaft for transmitting mechanical power.

Moreover, while in the following example illustrated in detail, specific reference is made to the use of a bottom bracket with cranks and pedals, it should be understood that the power generated by the user with his/her body may be transmitted to the vehicle by the arms, instead of the legs, using handles or grips instead of pedals.

In FIG. 1, reference numeral 10 generally indicates an assisted-pedal bicycle comprising a frame 11, a front wheel 13, a rear wheel 14, a handlebar 15 and a saddle 16. In the lower part of the frame 11, a drive device 17 is positioned, in which the following are integrated: a bottom bracket with pedals, cranks and pin; as well as an electric motor and members for combining the movement of the electric motor with the movement of pedals 19 connected by cranks 21 of the bottom bracket, generally indicated as a whole with reference numeral 23. The assisted-pedal bicycle 10 is also suitably provided with a battery pack 25 arranged in any suitable position on the frame 11, and shown only schematically in FIG. 1.

Within the scope of the present description and of the appended claims, the bottom bracket generally refers to the mechanism which receives, on a respective pin, the torque generated by the muscle force of the vehicle user. In the case of the bicycle, the bottom bracket comprises the pin 27, on the ends 27A whereof the pedal cranks 21 and the pedals 19 are keyed. In other human-powered vehicles, where different transmission mechanisms of the torque generated by the muscle force are used, different members may be provided which operate the pin of the bottom bracket in rotation.

Figure 2:
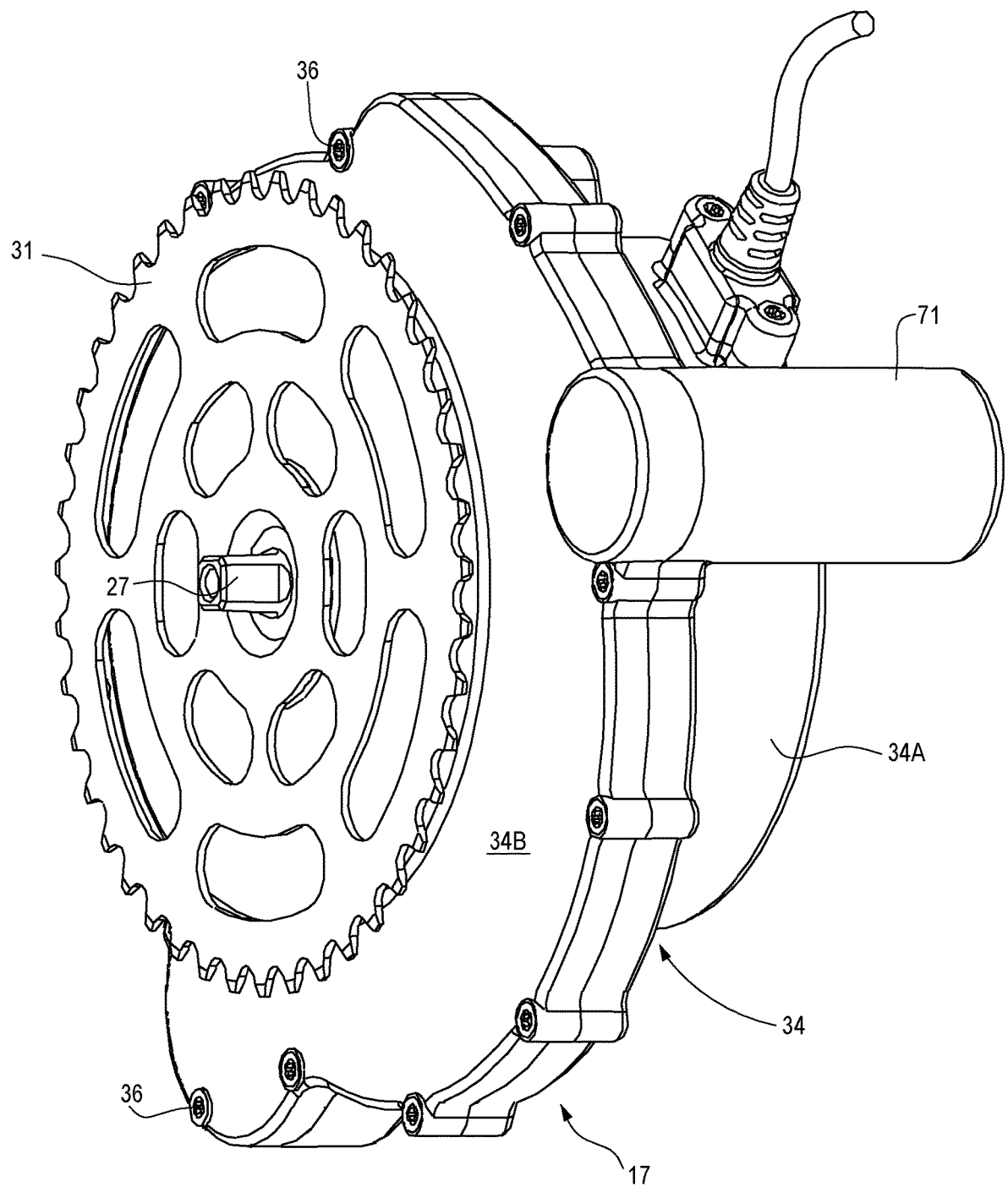
FIG. 2 is an axonometric view of the bicycle drive device on the side of the bicycle driving sprocket.
Figure 3:
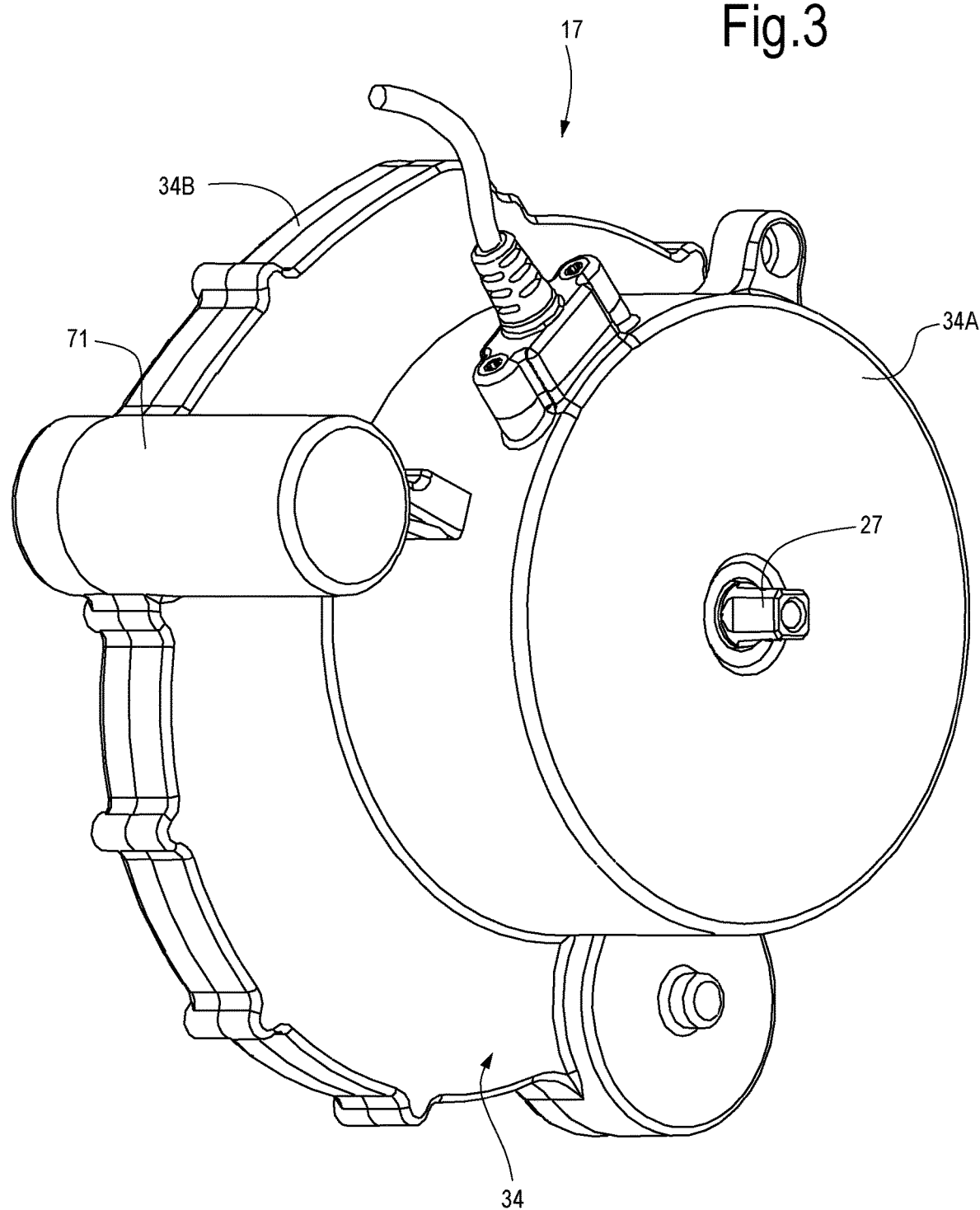
FIG. 3 is an axonometric view of the drive device in FIG. 2 on the side opposite the bicycle driving sprocket.

FIGS. 2 and 3 show two external axonometric views of the drive device 17, from which the pedals 19 and the pedal cranks 21 which connect the pedals 19 to a pin 27 of the bottom bracket 23 have been removed. Reference numeral 31 indicates the driving sprocket of the bicycle 10, around which a flexible continuous transmission member, such as a chain, a toothed belt, indicated with reference numeral 33, is guided, which is further guided around a pinion 32 associated with the rear wheel. 14 of the bicycle 10.

The drive device 17 comprises an outer casing or housing 34 (see in particular in FIG. 4), inside which there are housed an electric motor 35, a continuous variable speed drive 37, a first mechanical transmission indicated as a whole with reference numeral 39, which transmits the motion from the electric motor 35 to the variable speed drive 37, and a second mechanical transmission indicated as a whole with reference numeral 40, which transmits the motion from the variable speed drive 37 to the driving sprocket 31.

The casing 34 may comprise a body 34A and a cover 34B, joined together by means of locking systems, for example screws 36 or other. Through the casing 34 the pin 27 of the bottom bracket 23 of the bicycle 10 extends, which pin has two ends 27A to which the pedal cranks 21 are fixed.

In the embodiment shown, the electric motor 35 comprises a stator 41 and a rotor 43. Advantageously, the rotor 43 may be arranged inside the stator 41. The rotor 43 may be supported by bearings 44 in a seat provided in the housing 34. Reference numeral 45 indicates bearings for supporting the pin 27 inside the rotor 43. In the configuration shown, the pin 27 is coaxial to the rotor 43 and to the stator 41 of the electric motor.

In some embodiments, as shown in the drawings, the rotor 43 of the electric motor 35 may be torsionally coupled to a hollow shaft 47, inside which the bearings 45 supporting the pin 27 are housed. The hollow shaft 47 may be made in one piece with a first toothed wheel 49. In other embodiments, the first toothed wheel 49 may consist of a component separated from the hollow shaft 47 and torsionally constrained to the latter.

In the embodiment shown, the first toothed wheel 49 is separated from the electric motor 35 by a wall 51 which is part of the housing 34. In this way, it is possible to separate a containment compartment of the electric motor 35 with respect to a containment compartment of the variable speed drive 37 and of the respective motion transmission mechanisms up to the driving sprocket 31 of the bicycle 10. Suitable seals 52 and 53 may be provided to prevent mutual contamination of the two housing compartments of the electric motor 35 and of the variable speed drive 37.

The first toothed wheel 49 is adapted to transmit the rotation motion from the electric motor 35 to the variable speed drive 37 through the first mechanical transmission 39. The latter may comprise a gear train with a suitable transmission ratio. In the embodiment shown, the first mechanical transmission 39 comprises a first gear 55 and a second gear 57 coaxial and integral with each other, for example made in one piece. The two gears 55 and 57 may be idly supported on an auxiliary shaft 58, mounted in the housing 34.

The first gear 55 meshes with the first toothed wheel 49 and the second gear 57 meshes with an external toothing 62 of a ring 60 which is part of the variable speed drive 37. The ring 60 is rotatably supported on a supporting frame 63. In the embodiment shown, the supporting frame 63 is an annular frame which forms a track for the balls of a support bearing 65 for the ring 60, which rotates about its own rotation axis. The other track of the balls of the support bearing 65 is formed by the ring 60. In this way, the ring 60 is supported by the frame 63 so as to be capable of rotating with respect thereto around a rotation axis.

The frame 63 is mounted so that it can move with respect to the housing or casing 34. In the embodiment shown, the frame 63 is hinged about a pivoting or hinge axis A-A parallel to the rotation axis B-B of the pin 27. The pivoting axis A-A coincides with the axis of the shaft 58 on which the first gear 55 and the second gear 57 are idly mounted. In this way, the frame 63 can rotate about the axis A-A. The rotation movement of the frame 63 around the axis A-A can be controlled in any suitable manner.

Figure 5:
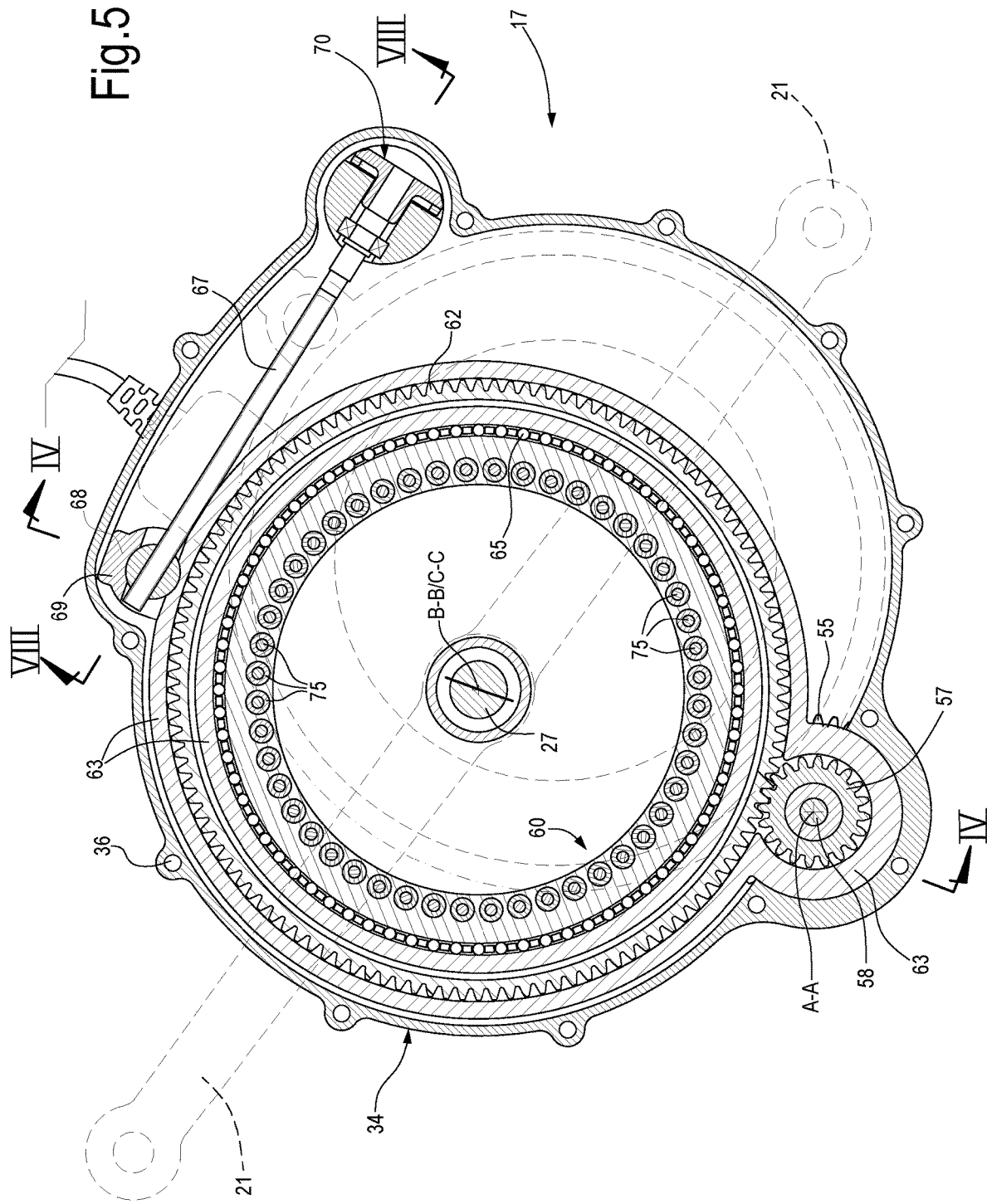
FIG. 5 is a section according to line V-V in FIG. 4.
Figure 6:
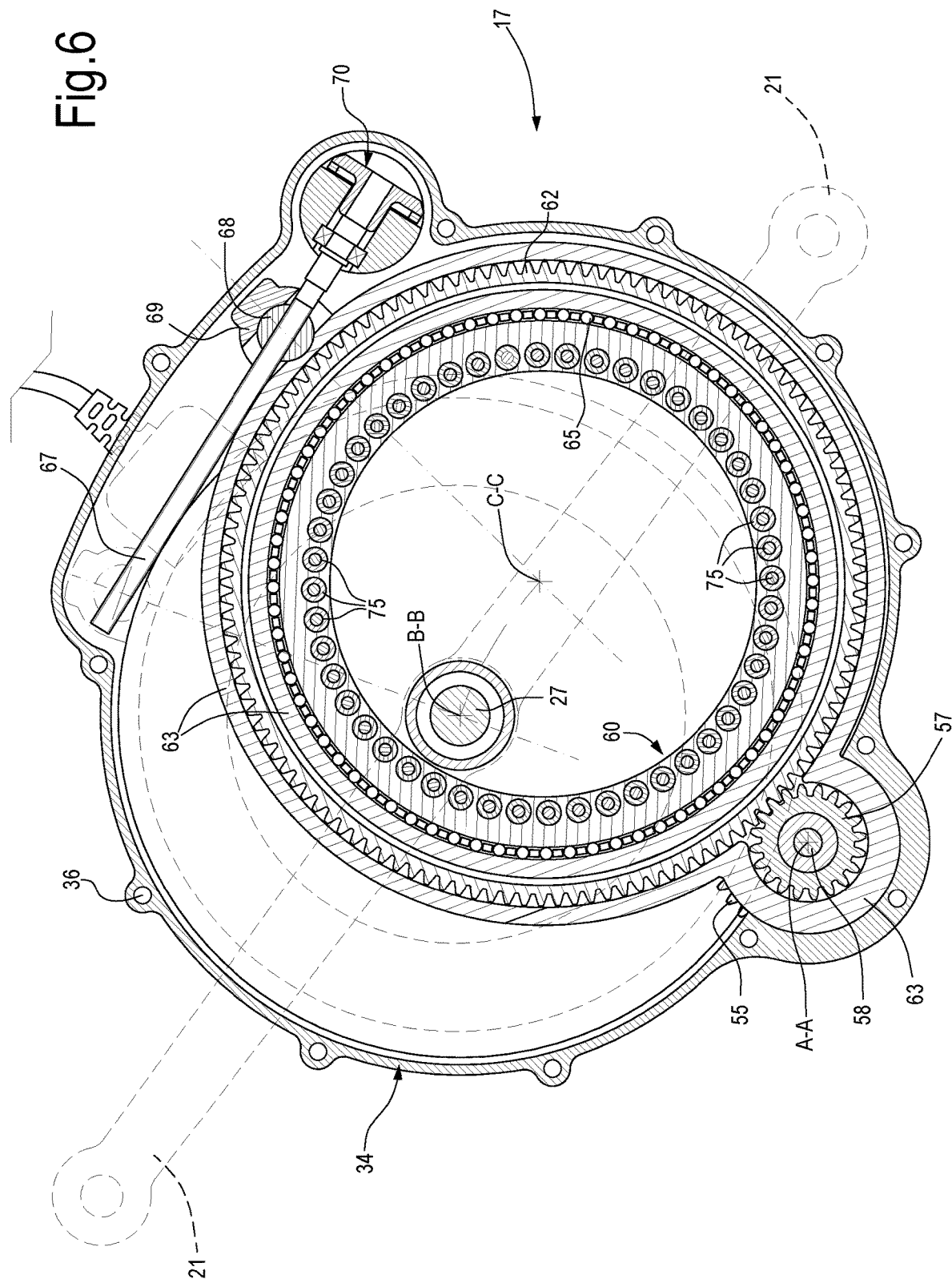
FIG. 6 is a section similar to the section in FIG. 5 in a different position of the variable speed drive.

In the embodiment shown, the rotation movement is controlled through a threaded bar 67 which engages in a nut 68 constrained in a seat 69 (see FIGS. 5 and 6) integral with the frame 63. In order to allow the rotation of the frame 63 around the axis A-A keeping the threaded bar 67 engaged in the nut 68, the latter may be rotatably supported about an axis parallel to the axis A-A while remaining engaged in the seat 69. The rotation of the threaded bar 67 in one direction or in the opposite direction causes the rotation or pivoting movement of the frame 63 about the pivoting axis A-A. FIGS. 5 and 6 show two end positions that the frame 63 can take with respect to the casing 34. The ring 60, being rotatably supported by the bearing 65 in the frame 63, participates in the rotation or pivoting motion of the frame 63 around the pivoting axis A-A.

C-C indicates the rotation axis of ring 60. As can be seen from the comparison between FIGS. 5 and 6, by rotating the frame 63 about the hinge or pivoting axis A-A, the rotation axis C-C of the ring 60, parallel to the pivoting or hinge axis A-A, moves from a position (FIG. 5) in which it coincides with the rotation axis B-B of the pin 27, to an eccentric position, that is, spaced with respect to the rotation axis B-B of the pin 27, shown in FIG. 6.

The rotation of the threaded bar 67 may be controlled manually, for example by means of a manual transmission system accessible from the handlebars of the bicycle.

In preferred embodiments, as illustrated in the drawings, the rotation of the threaded bar 67 is controlled by an actuator, for example an electric servo motor 71. In the embodiment shown, a pair of gears 70 transmits the motion from the electric servo motor 71 to the threaded bar 67. The electric servo motor 71 may be controlled by a central control unit 72 on the assisted-pedal bicycle 10.

As will be clear from the following detailed description of the operation of the variable speed drive 37, modifying the angular position about the axis A-A of the frame 63 and therefore of the ring 60 modifies the transmission ratio between the input and the output of the variable speed drive 37 and therefore between the electric motor 35 and the driving sprocket 31.

Figure 8:
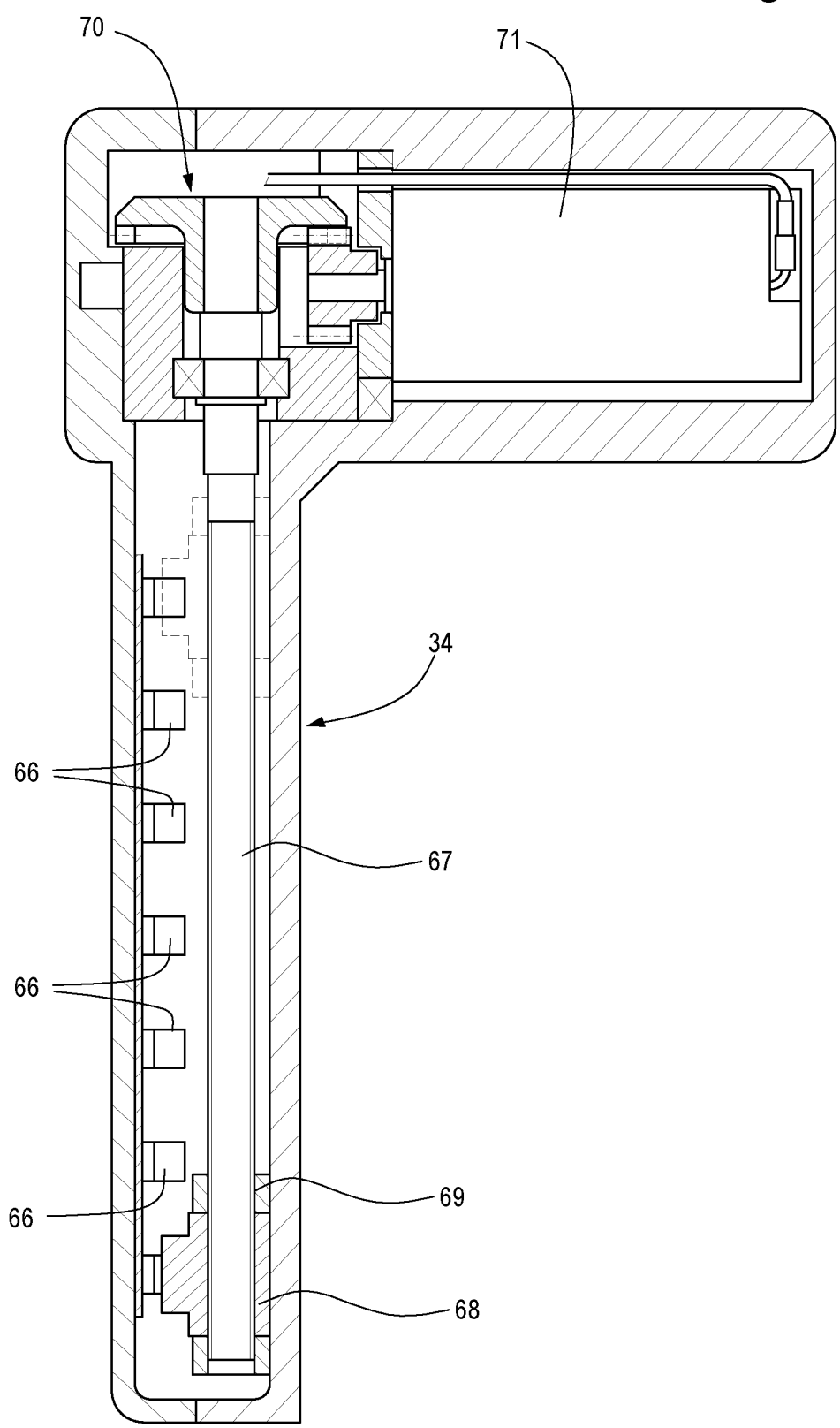
FIG. 8 is a section along line VIII-VIII in FIG. 5.

In some embodiments, as shown in detail in FIG. 8, the sensors 66 may be associated to the threaded bar 67 and to the nut 68, arranged mutually spaced apart with a suitable pitch along the axial extension of the threaded bar 67 and integral with the casing or housing 34. The sensors 66 may be interfaced to the central control unit 72 to provide information on the position of the nut 68 and therefore on the angular position of the frame 63 and of the ring 60 about the hinge or pivoting axis A-A. Each angular position corresponds to a given transmission ratio set on the variable speed drive 37. Rather than discrete sensors 66, a rotary encoder may be provided which detects the rotation of the electric servo motor 71 or the threaded bar 67.

The ring 60 is housed between two coaxial disks 73, which are part of the variable speed drive 37. The coaxial disks 73 are integral with each other and are rotatably mounted around the axis B-B of the pin 27. In contrast to the ring 60, the axis of the coaxial disks 73 is not movable, but always remains in the same position. The support bearing of the disks 73 on the pin 27 are indicated with reference numeral 74.

The ring 60 is provided with a plurality of driving members 75 arranged in an annular arrangement, i.e. along a circumference C, concentric to the rotation axis C-C of the ring 60. The driving members 75 co-act with opposite flat surfaces 73A facing each other of the disks 73. As will be explained in greater detail below, some of the driving members 75 are in conditions of mechanical grip with the coaxial disks 73 and cause the transmission of the rotation motion from the ring 60 to the coaxial disks 73.

Figure 7:
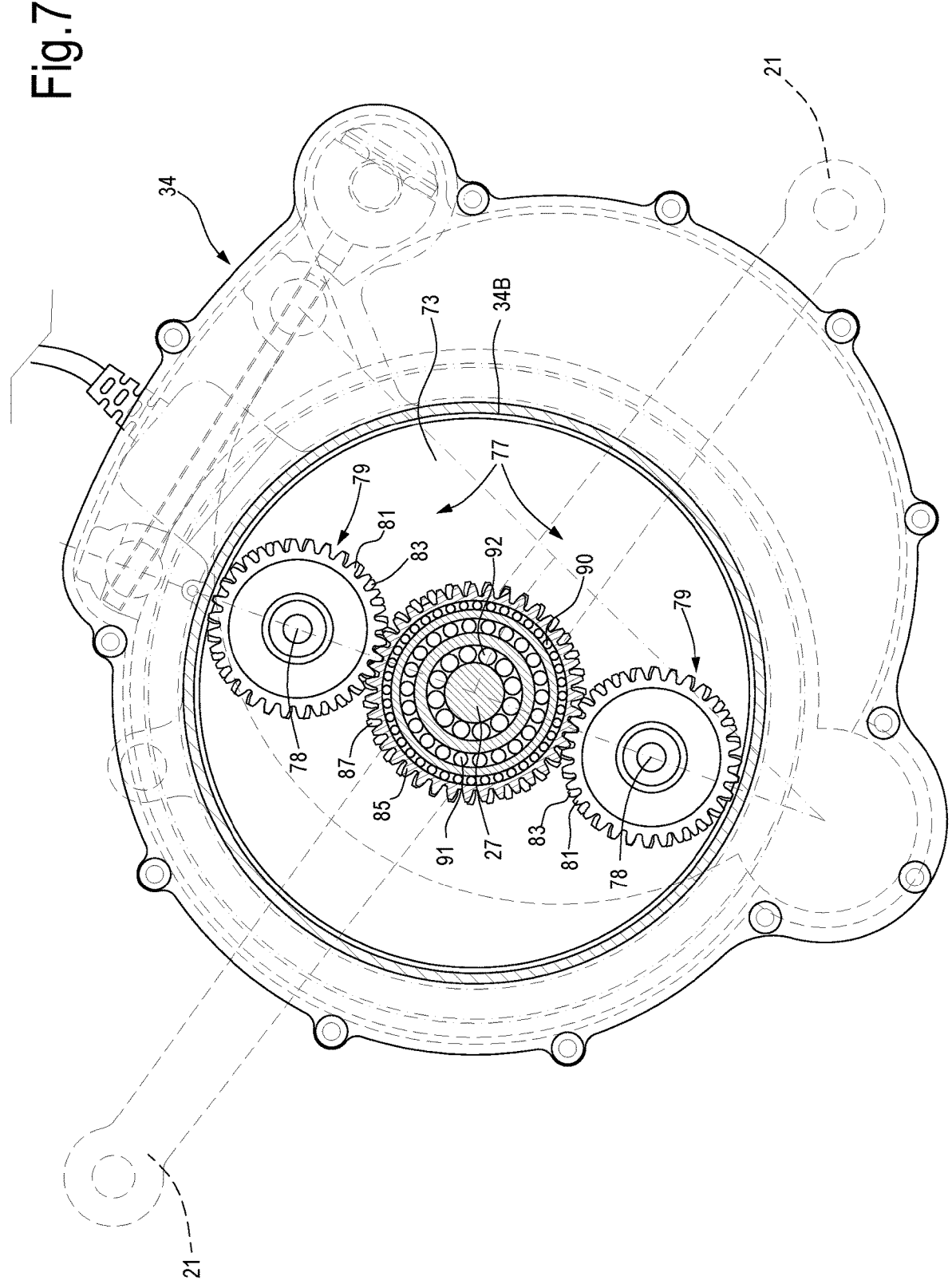
FIG. 7 is a section according to line VII-VII in FIG. 6.

The mechanical component formed by the two coaxial disks 73 integral with each other forms the planet carrier or train carrier of an epicyclic gear train 77 forming part of the second mechanical transmission 40. The shape of the epicyclic gear train is shown in particular in FIG. 7. Reference numeral 78 indicates pins integral with one of the coaxial disks 73 and on which planet wheels 79 of the epicyclic gear train 77 are idly mounted. Each planet wheel 79 comprises a double set of teeth and therefore constitutes a double gear. The two sets of teeths are indicated with 81 and 83. The gear with teeth 81 meshes with a set of teeth 85 of a fixed toothed wheel 86, i.e. rigidly connected to the casing or housing 34 and therefore stationary with respect to the frame of the bicycle 10. The fixed toothed wheel 86 may, for example, be formed in the cover 34B. The fixed toothed wheel 86 is coaxial with the pin 27. The gear formed by the set of teeth 83 meshes with a set of teeth 87 of a toothed wheel 89 coaxial with the pin 27 and rotatable about the axis B-B. The revolving toothed wheel 89 constitutes the driven member of the epicyclic gear train 77.

Reference numeral 90 indicates a support bearing, with which the toothed wheel 89 is supported in a seat, which may be formed in the cover 34B of the casing or housing 34. The bearing 90 is coaxial with a bearing 91 arranged between the toothed wheel 89 and the hub 31A of the driving sprocket 31. Inside the bearing 91 and coaxially therewith is a further support bearing 92 positioned between the pin 27 and the hub 31A of the driving sprocket 31.

The rotation is transmitted to the driving sprocket 31 alternately or jointly by the pin 27 and by the toothed wheel 89 constituting the driven member of the epicyclic gear train 77. The transmission occurs through one or the other or both of the two free wheels 93 and 94, which are concentric with each other. The free wheel 93 is placed between the pin 27 and the hub 31A of the driving sprocket 31, while the free wheel 94 is located between the hub 31A of the driving sprocket 31 and the toothed wheel 89. With this arrangement, the driving sprocket 31 torsionally couples both to the driving wheel 89 and to the pin 27. It is thus possible to transmit driving torque to the driving sprocket 31 selectively or jointly by means of the pedal cranks 21 and the pedals 19, or by means of the electric motor 35.

Figure 10:
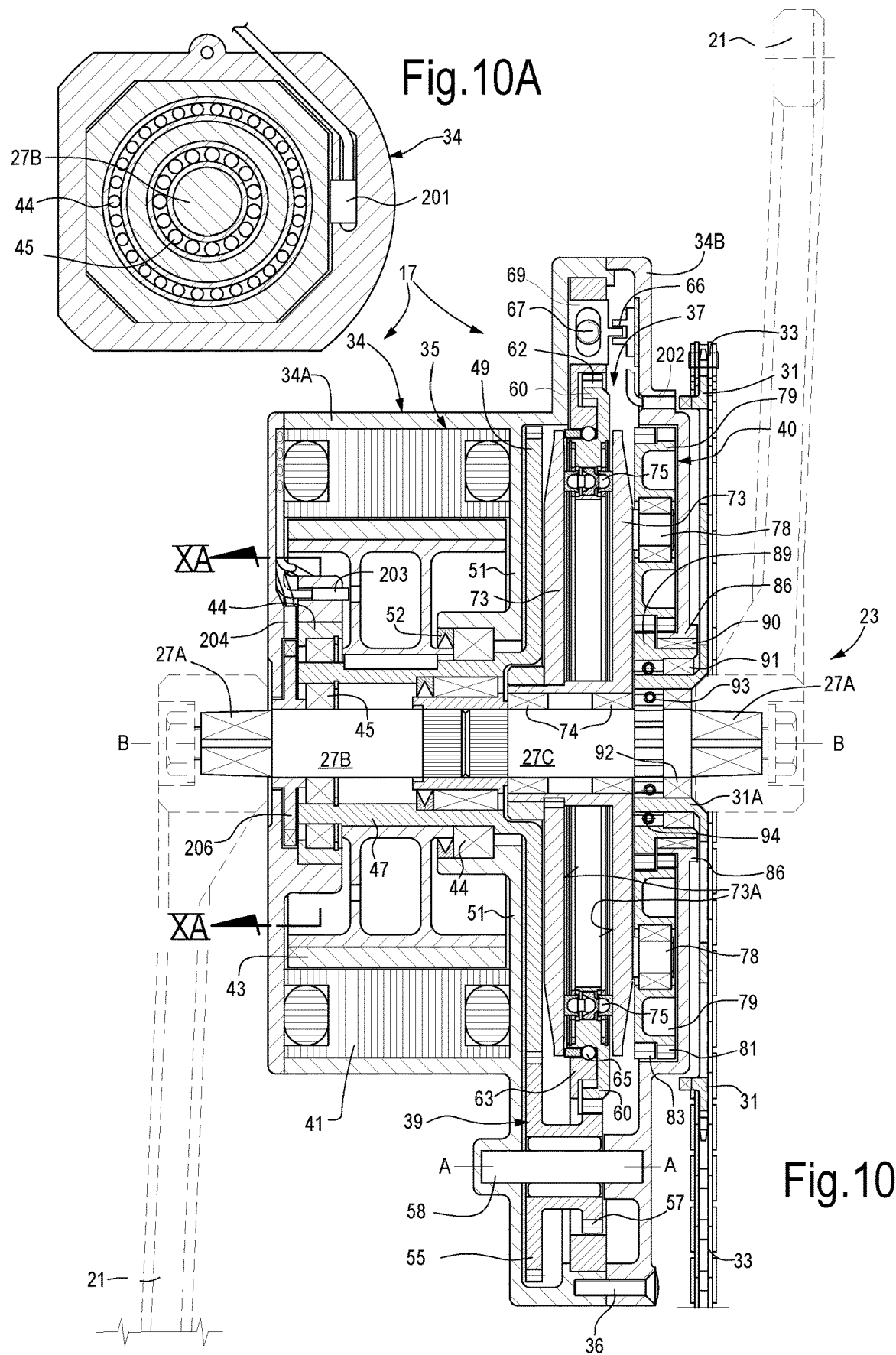
FIG. 10 is a section similar to the section in FIG. 4 of a second embodiment.

In some embodiments, it may be useful to provide the drive device 17 with a system for detecting the force applied by the user on the pin 27 of the bottom bracket 23, by means of the pedals 19 and the pedal cranks 21. FIG. 10 shows a section similar to the section in FIG. 4, of an embodiment of the drive device 17 in which a system for detecting the force applied to the pin 27 is incorporated. Equal numbers indicate parts that are the same or correspond to those already described above, which will not be described again.

In the configuration in FIG. 10, the pin 27 is divided into two portions 27B and 27C mutually connected by means of a slotted coupling. A sensor 201 (see FIG. 10A) is associated with the portion 27B of the pin 27, for example a load cell, which detects the reaction force on the bearing 44. The pin 27 is subdivided into two portions 27B and 27C in order to obtain an isostatic structural scheme, so as to correctly detect the force through the load cell 201.

The detection of the force applied on the pin 27B by the user of the vehicle through the pedals 19 and the pedal cranks 21 can be useful in some modes of managing the drive device 17, as will be described later.

Reference numeral 203 indicates a sensor, for example an optical, magnetic, capacitive or similar sensor, which can detect the rotational speed of the rotor 43 of the electric motor 35. This sensor is also provided in the configuration in FIG. 4. Reference numeral 204 indicates a sensor, similar to sensor 203, which can detect the rotation speed of pin 27, for example by means of a toothed wheel or toothed disk 206 keyed on pin 27. The same arrangement of components 204, 206 can also be provided in the embodiment in FIG. 4.

Figure 4:
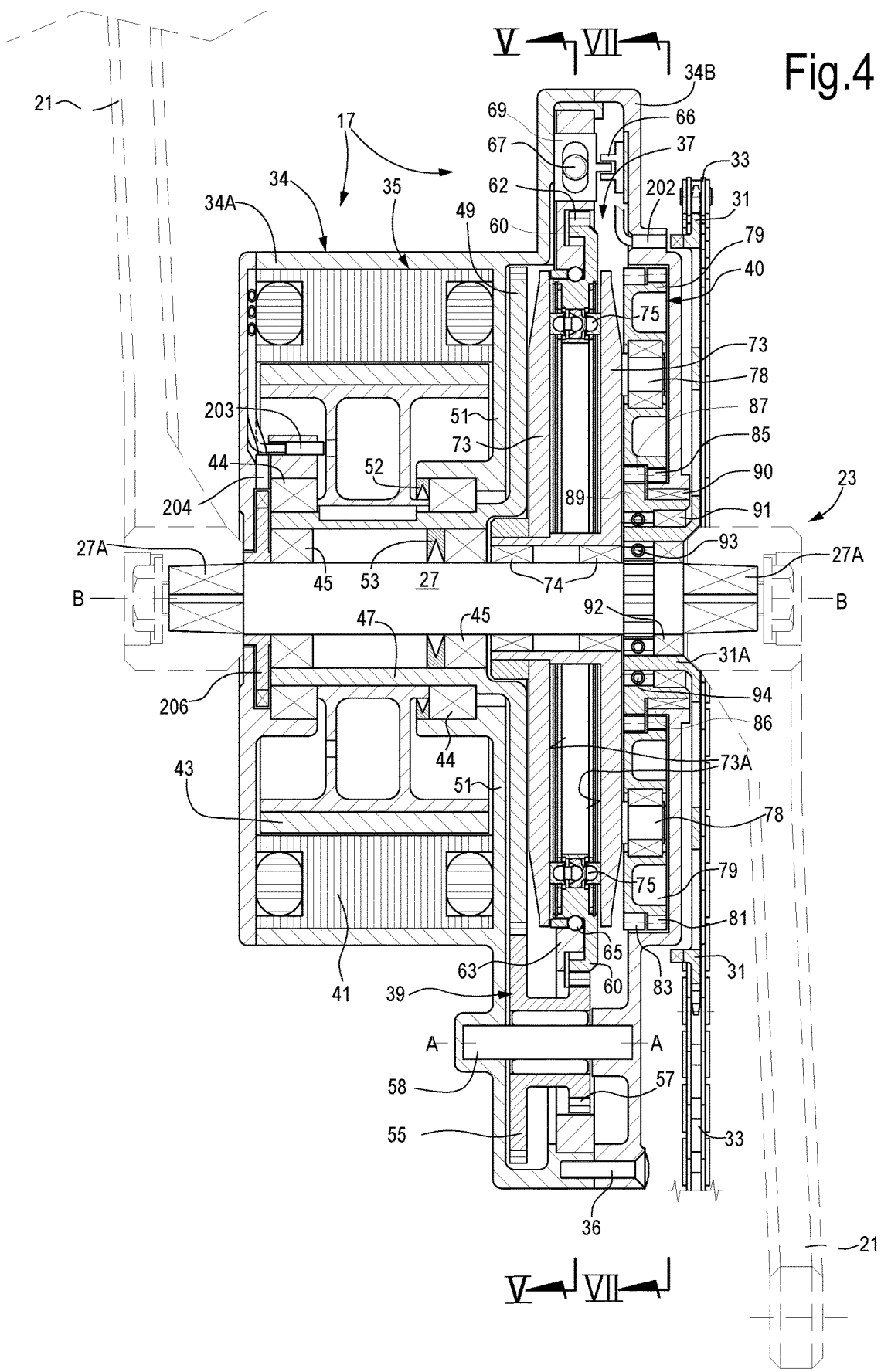
FIG. 4 is a section according to line IV-IV in FIG. 5 of the drive device.

Reference numeral 202 indicates a speed sensor of the driving sprocket 31, which may also be provided in the embodiment in FIG. 4.

The structure of the variable speed drive 37 will be described in greater detail hereinafter, with specific reference to the driving members 75 carried by the ring 60.

Figure 12:
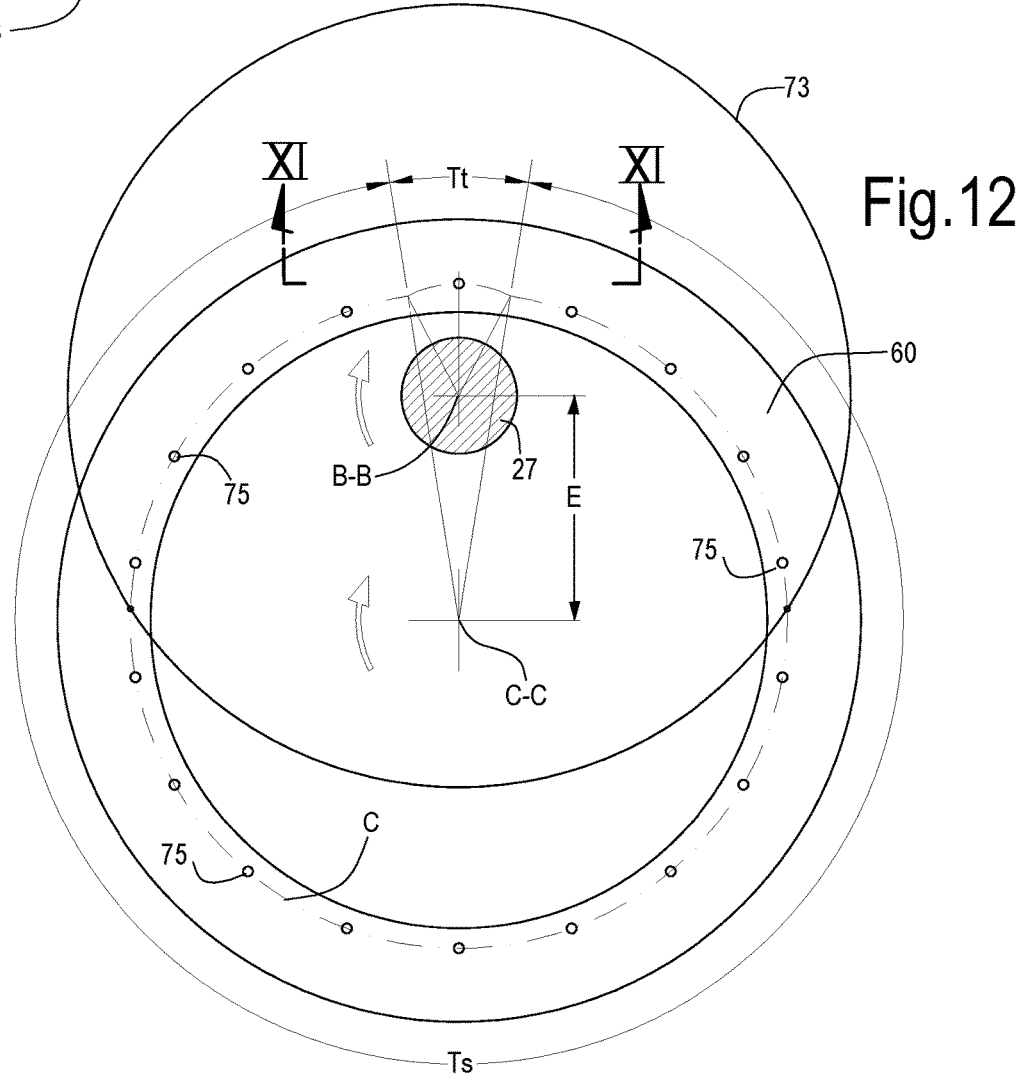
FIG. 12 is a schematic view of the ring and of the coaxial disks as well as of the trajectory of the drive members of the variable speed drive in a view according to a direction parallel to the axes of rotation of the ring and of the coaxial disks.

FIG. 12 schematically shows the two main components of the variable speed drive 37, i.e. the ring 60 and the pair of coaxial disks 73. In FIG. 12, the rotation axes B-B and C-C are not coincident, but spaced and therefore eccentric with an eccentricity E. This eccentricity E varies by rotating the frame 63 around the hinge or pivoting axis A-A. FIG. 12 also schematically shows some driving members 75 arranged annularly on the circumference C, which also represents the trajectory traveled by each driving member 75. The circular trajectory C is divided into two portions indicated with Tt and Ts, respectively. The trajectory portion Tt will be referred to hereinafter as a driving trajectory portion, while the trajectory portion Ts will be referred to as a sliding trajectory portion. The driving members 75, which are located along the circumferential arc corresponding to the driving trajectory portion Tt are mechanically engaged to the coaxial disks 73 so as to frictionally transmit the torque provided by the ring 60 to the flat surfaces 73A. Vice versa the driving members 75, which are located along the circumferential arc corresponding to the sliding trajectory portion Ts, slide on the flat surfaces 73A of the coaxial disks 73. The reason for the different dynamic behavior of the driving members will be clear from what will be described hereinafter with reference to the diagram in FIGS. 16 and 17.

As can be understood from the diagram in FIG. 12, by varying the eccentricity E, the transmission ratio between the ring 60 and the coaxial disks 73, and therefore ultimately the transmission ratio of the variable speed drive 37, changes. Since the distance or eccentricity E can vary continuously due to the rotation of the frame 63 around the hinge or pivoting axis A-A, the variable speed drive 37 may be able to provide a continuous variation of the transmission ratio.

Figure 11:
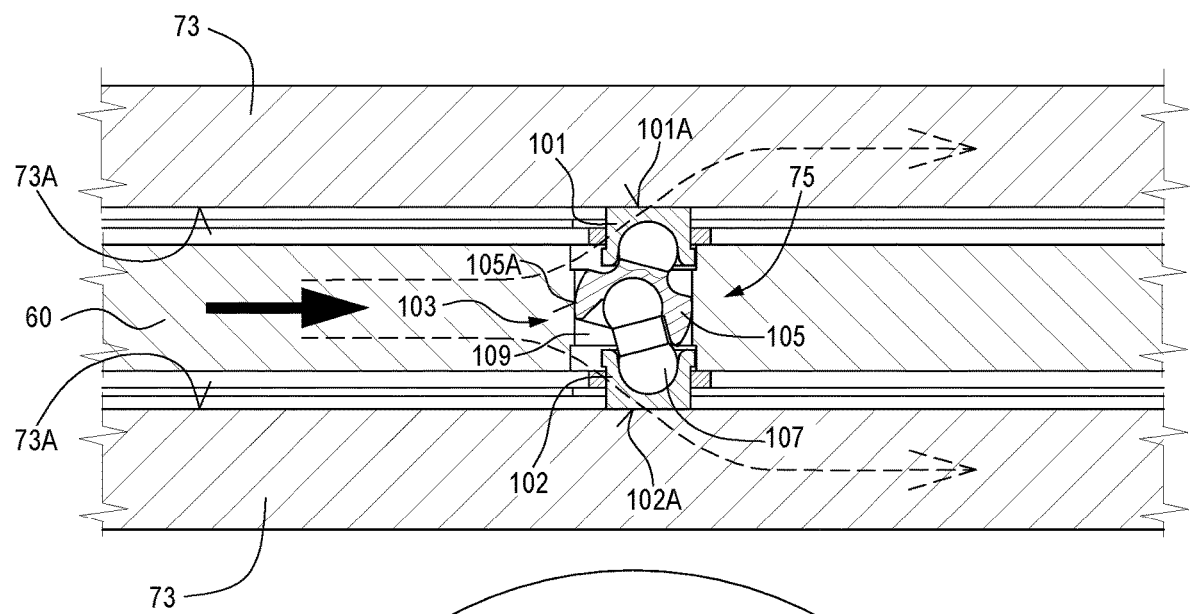
FIG. 11 is an enlarged section according to line XI-XI in FIG. 12.
Figure 13:
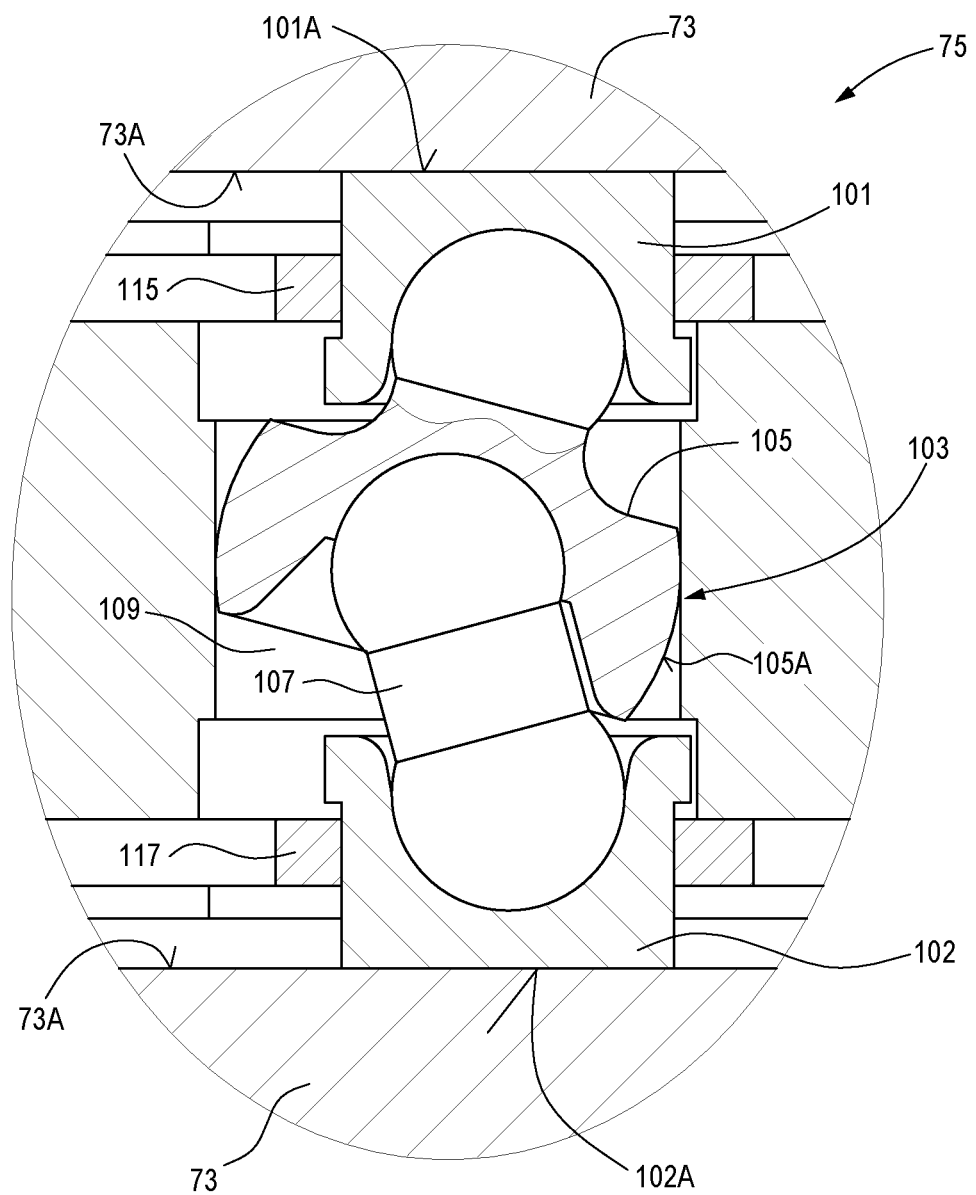
FIG. 13 is an enlargement of a driving member.

FIGS. 11 and 13 show in greater detail a possible embodiment of the driving members 75. FIG. 11 shows an enlargement of a section according to line XI-XI in FIG. 12, while FIG. 13 shows an enlargement of a single driving member 75.

In this embodiment, each driving member 75 comprises two contact and sliding elements co-acting with the opposite surfaces 73A of the two coaxial disks 73. The contact and sliding elements are indicated by reference numerals 101 and 102 (see in particular FIG. 13). In this exemplary embodiment, the contact and sliding elements 101 and 102 are in the form of caps with flat front surfaces 101A, 101B, configured to be in contact with the mutually opposite flat surfaces 73A of the two coaxial disks 73. The two contact and sliding elements 101, 102 are joined together by an intermediate mechanical connection 103.

In the illustrated embodiment, the intermediate mechanical connection 103 comprises two components 105 and 107, mutually hinged by means of a spherical joint. The spherical joint may be formed by a first end of the component 107 having a convex hemispherical shape, which engages in a concave semi-spherical shaped seat formed in the component 105. The semispherical seat of the component 105 has in turn a toroidal or spherical outer surface 105A in contact with the surface of a through hole constituting a receiving seat 109 of the driving member 75, formed in the ring 60. The outer toroidal or spherical surface 105A is thus in sliding contact with the seat in which the respective driving member 75 is inserted.

In the embodiment shown, each component 105 and 107 has a respective hemispherical end, opposite the articulation consisting of the spherical joint described above. The hemispherical ends of the components 105 and 107 facing the two coaxial disks 73 engage in respective semispherical seats formed in the contact and sliding elements 101 and 102, thus forming two respective spherical joints through which the intermediate mechanical connection 103 is connected to the contact and sliding elements 101 and 102.

The contact and sliding elements 101 and 102 of each driving member 75 may be engaged to respective elastic members, which urge the driving member 75 to a predetermined position. In the illustrated embodiment, the elastic members comprise, for each contact and sliding element 101,102, a respective elastic appendage 115, 117. The shape of the elastic appendages 115 and 117 is particularly visible in FIGS. 14 and 15. The elastic appendages 115 may be integral with a common annular member 116, while the elastic appendages 117 may be integral with a common annular member 118. In some embodiments, each annular member 116, 118 may be formed in one piece with the respective elastic appendages 115, 117, for example by punching from a metal sheet. In other embodiments, different elastic members may be used for the same function.

Figure 9:
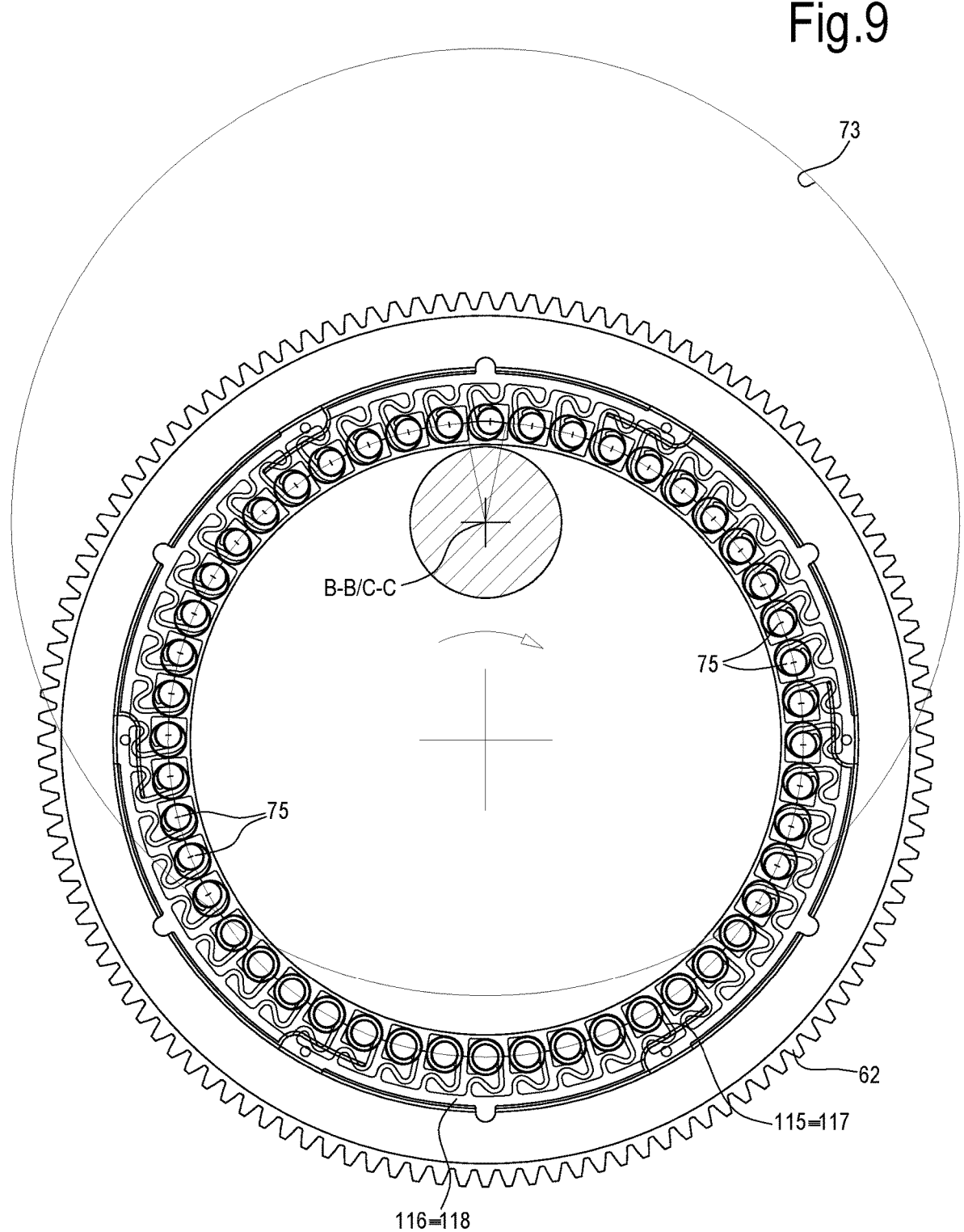
FIG. 9 is a view of the variable speed drive ring on the side of the bicycle driving sprocket, with parts removed.

In FIG. 15, reference numerals 119 and 121 indicate annular covers, with which the annular members 116 and 118 are fixed to the ring 60. These elements 119 and 121 are omitted in FIGS. 9 and 14 for greater clarity of representation.

The dynamic behavior of the driving members 75 and the manner in which they transmit motion to the coaxial disks 73 will now be described in greater detail with specific reference to FIGS. 16 and 17.

As mentioned above, the circumference C representing the trajectory of the driving members 75 is divided into a driving trajectory portion Tt and a sliding trajectory portion Ts. The driving trajectory portion Tt is that along which the driving members 75 transmit a torque to the coaxial disks 73. The sliding trajectory portion Ts is that along which the driving members 75 do not transmit a torque to the coaxial disks 73, but rather slide along the flat surfaces 73A thereof.

The driving trajectory portion Tt begins at the point indicated by p1 (FIG. 16), in which the speed vector of the driving member 75 at the input to the driving trajectory portion Tt is superimposable to the parallel component of the speed vector of the coaxial disks 73 in point p1 (FIG. 16). In this way, the coaxial disks 73 are driven by each drive member 75 until it reaches point p2, concurrently with the arrival of a new driving member 75 at point p1. Point p2 indicates the end of the driving trajectory portion Tt.

The prerequisite for a particular driving member 75, which is about to enter the driving trajectory portion Tt in FIG. 16, abandoning the sliding state of the sliding trajectory portion Ts and starting to transmit the motion to the coaxial disks 73, occurs when the speed vector Va of the driving member 75 overlaps the parallel component of the speed vector Vdp1 of the coaxial disks 73 at the mutual contact point p1, while simultaneously the driving step by the preceding driving element 75 (point p2) ends.

FIG. 16 shows the start and end situations of the driving step along the driving trajectory portion Tt of points p1 and p2, symmetrically located with respect to the straight line connecting the centers of the ring 60 and the coaxial disks 73 (represented by the points where axes C-C and B-B pass).

In the points p1 and p2 there is the particular situation in which the speed vector Va of the driving members 75 coincides with the parallel component of the speed vector Vdp1 and Vdp2 of points p1 and p2 of the coaxial disks 73.

Starting from the starting point p1, the ring 60 starts to transmit the motion to the coaxial disks 73 through the driving member 75. While the driving member 75 is in the driving trajectory portion Tt and transmits the motion from the ring 60 to the coaxial disks 73, the other driving members 75 which are located along the sliding trajectory portion Ts slide, i.e. they slide along the opposite flat surfaces 73A of the coaxial disks 73 due to the different dynamic conditions in the contact points of the driving members 75 in the sliding trajectory portion Ts, as will be explained below.

It should also be noted that the sliding trajectory portion Ts begins with an amplitude arc "Ω" (FIG. 17), in which various factors concur to determine a situation of uncertainty with respect to the driving or sliding condition. Said factors depend on specific conditions of the assembly as regards the size of the parts and elasticity of the materials used, input speed, transmission ratio and do not allow establishing exactly the above driving or sliding state of the driving members 75 transiting along arc "Ω".

Figure 17:
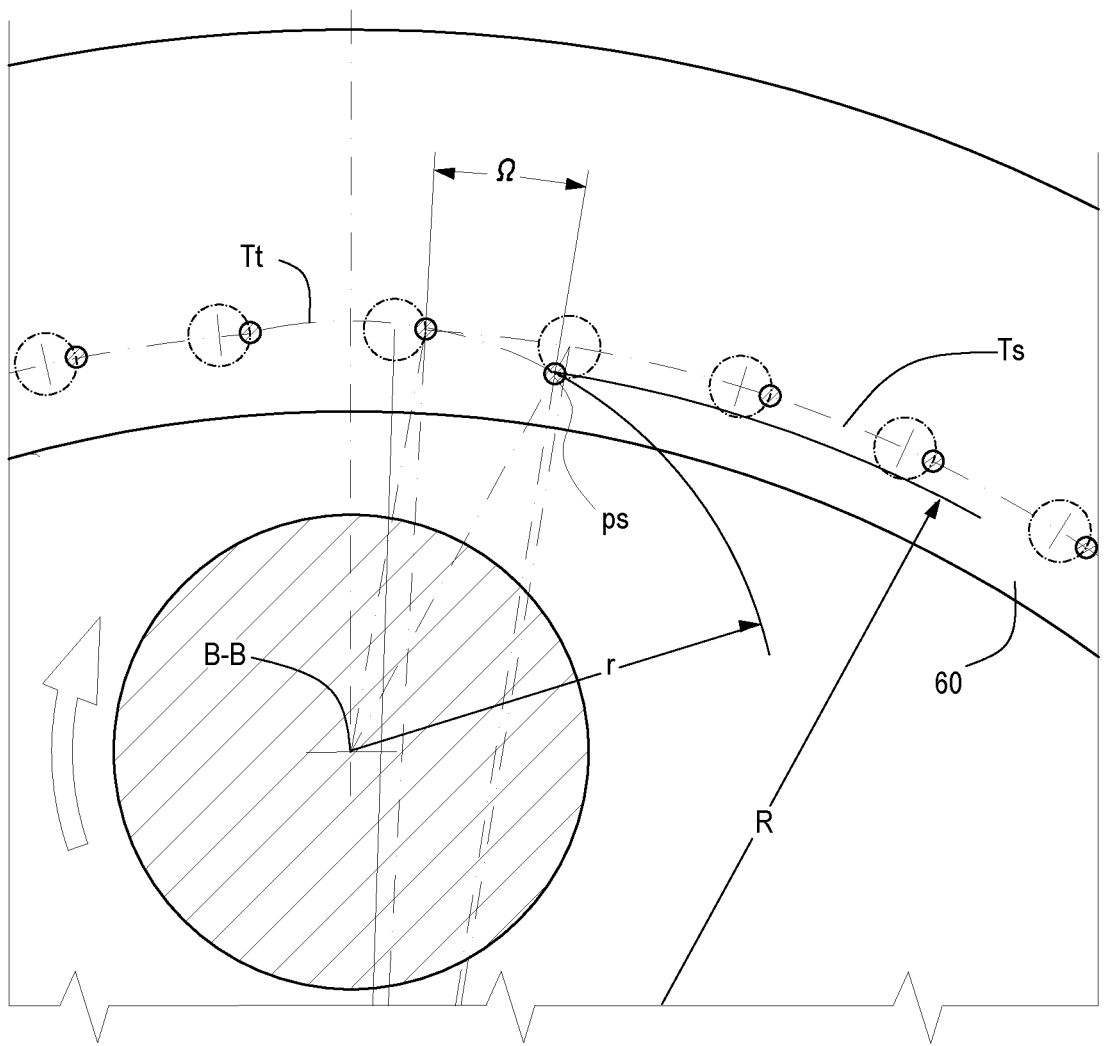

The uncertainty characteristic of the arc "Ω", however, ends at point ps in FIG. 17, when the contact point between the coaxial disks 73 and the driving member 75 reaches the line joining the centers of the receiving seat 109 of the driving member 75 and the coaxial disks 73.

After reaching the configuration in FIG. 17, the driving member 75 in contact with the coaxial disks 73 in point ps is forcibly brought into sliding conditions due to the bifurcation of the trajectories of the driving member 75 (which continues to move along the circumference C of radius R) and of point ps seen as integral with the coaxial disks 73, which follows the circular trajectory of radius r.

The subsequent progressive increase in the distance between the driving member 75 and the center of the coaxial disks 73 forces the release of the driving member 75 with respect to the coaxial disks 73.

In the remaining sliding trajectory portion Ts, it is observed that in the contact point of any driving member 75, which is in transit on this sliding trajectory portion Ts, the speed of the driving member 75 is smaller than the speed component of the coaxial disks 73 parallel to said speed of the driving member 75. This causes the driving members 75 to slide relative to the coaxial disks 73.

As an example, FIG. 16 shows the situation of the speeds relative to a driving member 75 located at a random point indicated with pn of the sliding trajectory portion Ts. At this point, the speed Va of the driving member 75 is smaller than the component parallel to Va of the speed Vdpn of the coaxial disks 73. This component of speed Vdpn is indicated in FIG. 16 with C(Vdpn). This condition occurs for all the driving members 75 which are located along the sliding trajectory portion Ts.

The sliding trajectory portion Ts comprises, in a certain range of transmission ratios, a part located outside the coaxial disks 73, between the points pu and pi in FIG. 16. Along this arc, the elastic appendages 115, 117 (FIGS. 14, 15) bring the driving members 75 back in alignment as shown in the section in FIG. 15, that is, in a position suitable for the next input (in point pi) of the driving members 75 between the coaxial disks 73. Subsequently, between point pi and point p1, the elastic appendages 115, 117 or other elastic members, ensure constant contact between the driving members 75 and the coaxial disks 73, so that each driving member 75 that reaches point p1 is immediately forced against the coaxial disks 73 and therefore enters the driving step.

The management of the performance and the type of operation of the drive device described above is entrusted to the central control unit 72, which can be interfaced to a control panel 72A. The central control unit 72 and the control panel 72A may contain all the electrical/electronic components adapted to drive and control the drive device following the programmed instructions of specific routines and/or applying the results of specific algorithms, depending on the type of management, some examples whereof are given below.

By way of example, the central control unit 72 may in particular be interfaced with: the battery pack or electric accumulator 25; the electric motor 35; the electric servo motor 71 for driving the variable speed drive; a speed sensor 204 of the central pin 27; a speed sensor 203 of the electric motor 35; a speed sensor 202 of the driving sprocket 31; a force sensor 201 on the pin 27 (provided for example in versions in which the energy data entered through the pin 27 must be known); position sensors 66 of the variable speed drive; control panel 72a with a display showing the status of the device and the commands set.

The performance of the drive device may be managed by different drive and control methods, of which some illustrative and non-limiting examples are provided.

According to a first embodiment, for example, a completely manual control of the variable speed drive 37 is provided with the possibility of selecting infinite ratios, the entity of which can be detected by the sensors 66 and indicated on a display. The manual control of the variable speed drive 37 may be combined with a manual control of the electric motor 35, with the possibility of selecting multiple levels of constant performance, also indicated on a display.

In this type of management of the electric motor 35 and of the variable speed drive 37, the energy supplied to the drive device through the pin 27 of the bottom bracket 23, i.e. through the axis of the pedals 19, is added to the energy supplied by the electric motor 35 and together they contribute in determining the advancement speed of the vehicle 10, up to the maximum speed set. When this speed is reached, the supply of electric current to the electric motor 35 is interrupted, providing an on/off management of the energy supplied to the drive device by the electric motor 35.

According to another embodiment, a manual control of the variable speed drive 37 is provided, through the servo motor 71, with the possibility of selecting a predetermined number of ratios, in particular corresponding to the number of sensors 66 set up to constitute intermediate stations and detect the corresponding ratio to indicate on the display. The management of the electric motor 35 may be the same as in the previous mode.

This command mode may be integrated by the possibility of freely selecting the ratios by providing the user with a selector command of the two alternative modes.

According to other embodiments, an automatic control of the variable speed drive 37 is provided, together with a manual control of the electric motor 35, with the possibility of selecting multiple levels of constant performance, which may be indicated on a display. In this drive and control mode, the automatic management of the variable speed drive 37 depends on the results of an algorithm which tends to obtain the highest possible speed of vehicle 10 by processing the data flowing to the central control unit 72, for example data concerning: rotation speed of the electric motor 35, speed of the assisted-pedal vehicle 10, current absorption of the electric motor 35.

According to yet another embodiment, an automatic control is provided of both the variable speed drive 37 and of the electric motor 35 through management modes that favor the saving of electrical energy. In this drive and control mode, a specific algorithm processes the data flowing to the central control unit 72, through the aforementioned connections, and returns the useful information for the control of the variable speed drive 37 and of the electric motor 35 with compensating management mode of the mechanical energy introduced into the drive device through the two separate input ways (pedals and electric motor). This mode of operation makes the values of energy supplied to the device through the pin 27 of the bottom bracket 23 and through the electric motor 35 complementary, with priority of the energy coming from the pedals, keeping the sum of the energies delivered always equal to a preset energy total transiting in the drive device. This total energy value may have a maximum determined by the standards or by the manufacturer of the drive device. This value is divided into fractions which can be referred to different modes of use of the vehicle 10, pre-settable by the user and, possibly, linked to specific algorithms. Basically, according to this mode of operation, a greater energy coming from the pedals 19 corresponds to a lower energy coming from the electric motor 35 up to the limit energy condition totally introduced through the pin 27 of the bottom bracket 23, actuated by the pedals 19.

As explained above, this drive and control mode requires information on the energy delivered through the pin 27 of the bottom bracket 23. For this purpose, a sensor (201) of the force exerted on the central pin 27 is provided, according to the embodiment illustrated in FIG. 10.

The drive device 17 described above does not require any adjustment, neither during installation on the vehicle nor during use; therefore, it does not require particular skills for the installer and above all for the user.

As far as maintenance is concerned, it is very little, limited to the periodic check of the oil level (of which there is no consumption) and to the cleaning and lubrication of the chain 33, which can however be replaced by a toothed belt, thus obtaining a further decrease in maintenance demand, approximating it to zero.

The maximization of durability and reliability makes the system suitable for use on vehicles that are used intensively, which require high reliability of the motion transmission system. Consider, for example, vehicles such as cycle-taxis, tricycles, quadricycles, cyclotouring cars, urban-rickshaw, cycle-tandem that, in addition to requiring reliability, do not allow easy access to the mechanical transmission to make repairs or intervene during use in the case of simple escape of the chain 33, as often happens in traditional transmission systems.

Moreover, the chain 33, running constantly aligned, does not have any problem of early wear, typical of derailleur systems and a type of chain of greater width may be used, with further advantage in terms of duration.

Therefore, a normal long-term wear of the sprocket 31/chain 33/pinion 32 assembly is obtained, which during its progression does not in any way affect the good operation of the change-over ratio process, as happens in traditional systems in which the chain quickly loses its transverse rigidity due to wear, thus also jeopardizing the operation of the gear change.

The integration of the variable speed drive 37 with the electric motor 35 into a compact unit offers a first advantage in terms of containing the number of supports and casings required, with respect to two separate devices and therefore saving on the overall weight.

A second advantage is provided by the positioning of the drive device 17 close to the center of gravity of the vehicle 10, with notable improvement of the dynamic features and handling of the vehicle 10, in addition to not requiring special or reinforced rear wheels and allowing full positioning freedom of the battery 25 on the vehicle 10.

The use of the variable speed drive facilitates the choice of the correct transmission ratio required by the various conditions of use of the vehicle, without the constraints imposed by fixed ratio gearboxes.

Moreover, the subject variable speed drive 37 is mechanically adapted to be controlled by a servo-control 71.

The variable speed drive 37 is capable of performing changes in the ratio with absolute fluidity, without jams or noises; the variation of the transmission ratio occurs in a way not perceptible to the user and does not require any waiting time to start the change operation.

The drive device also provides the useful feature of being capable of being set on a given ratio when the vehicle is stationary, with an advantage for all those cases in which the vehicle 10 encounters considerable resistance to starting the movement, such as starting uphill and, in any case, starting vehicles of considerable weight.

The variable speed drive 37 is shaped so as to have a very small axial size; its shape recalls that of a disk. In this way, considerable space saving is obtained in the direction of the rotation axis, which is useful for arranging the electric motor 35 on the same axis and remaining within such dimensions as to assemble the cranks 21 at the ends of the pin 27, in compliance with the ergonomic requirements.

The variable speed drive 37 has features that can promote production economy.

It is noted that the variable speed drive 37 consists not only of the coaxial disks 73 and of the ring 60 of simple construction, but also of groups of identical parts, the driving members 75 and the elastic elements thereof, which produced in large numbers will find a certain advantage in the economies of scale.

The foregoing description relates to a drive device 17 for an assisted-pedal vehicle 10. However, as can be understood from the foregoing, the features of constructive simplicity, reliability and lack of maintenance of the variable speed drive 37 make it a useful and particularly advantageous device also in applications other than those illustrated. Therefore, although in the present description reference has been made specifically to the application of the variable speed drive 37 to an assisted-pedal vehicle, it is to be understood that the features of the variable speed drive 37 may also be used in other applications. Likewise, the drive device 17 containing the variable speed drive 37 may be used in applications different than the operation of an assisted-pedal vehicle.

Figure 19:
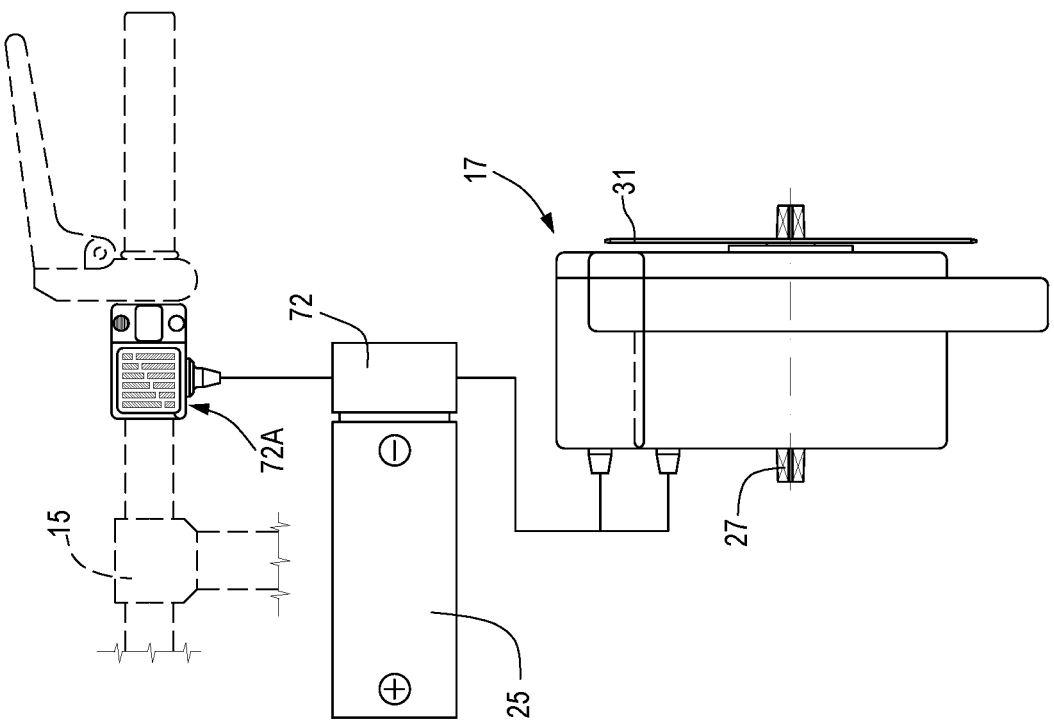
FIGS. 18 and 19 are diagrams of the control means of the drive device and of the electric energy source of the pedal-assisted bicycle.
Figure 18:
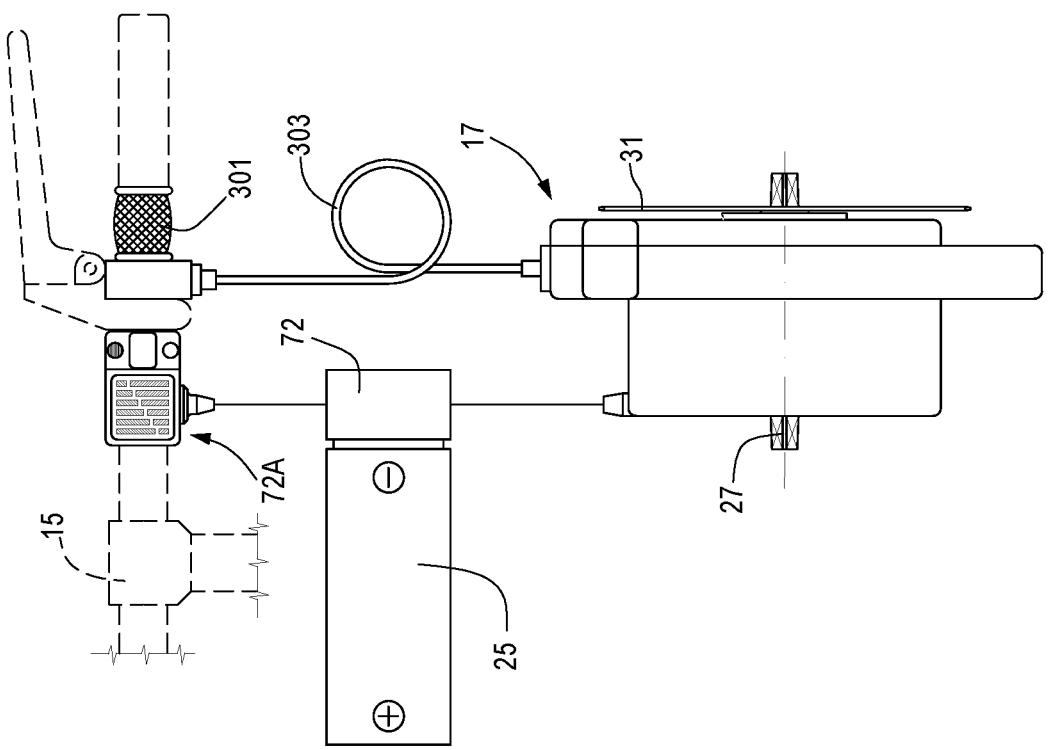

FIGS. 18 and 19 show two embodiments of the drive and control means of the drive device 17. FIG. 18 shows the diagram of a manual gearbox configuration. The control panel 72A with relevant display is mounted on the handlebar 15 of the bicycle 10. In this diagram, the central control unit 72 is associated with the battery pack 25. A knob 301 mounted on the handlebar 15, of the type usually used to operate a traditional bicycle gearbox, is connected via a transmission member 303 to the variable speed drive, to control the movement of the ring 60. The transmission member may comprise a sliding cable in a sheath. The user can modify the transmission ratio of the variable speed drive by means of the knob 301 and the transmission member 303.

FIG. 19 shows a diagram in which the gear change is electronically controlled, based on settings made by the user via the control panel 72A.

Various aspects and embodiments of the invention described herein are indicated in the following clauses:

Clause 1. A variable speed drive comprising:
- a ring adapted to rotate about a first rotation axis;
- two coaxial disks, rigidly connected to each other, adapted to rotate about a second rotation axis parallel to the first rotation axis; wherein the ring is at least partially housed between the two coaxial disks;
- a plurality of driving members, carried by the ring and arranged according to an annular arrangement coaxial to the ring; said driving members being arranged and configured to co-act with mutually opposite surfaces of the two coaxial disks, transmitting a rotation motion from the ring to the two coaxial disks;
- a device for adjusting the distance between the first rotation axis and the second rotation axis.

Clause 2. The variable speed drive of clause 1, wherein the opposite surfaces of the two coaxial disks are substantially flat and orthogonal to the first rotation axis and to the second rotation axis.

Clause 3. The variable speed drive of clause 1 or 2, wherein each driving member is held in position by at least one respective elastic element, or by a pair of elastic elements.

Clause 4. The variable speed drive of clause 3, wherein the elastic elements comprise, for each driving member, an elastic appendage integrally made with a common annular member, which extends around the annular arrangement of the driving members.

Clause 5. The variable speed drive of clause 3, wherein said elastic elements comprise, for each driving member, a first elastic appendage integrally made with a first common annular member, and a second elastic appendage integrally made with a second common annular member, and wherein the first common annular member and the second common annular member are applied on two opposite sides of the ring.

Clause 6. The variable speed drive of one or more of the preceding claims, wherein each driving member comprises two contact and sliding elements for contacting the opposite surfaces of the two coaxial disks and sliding thereon, and an intermediate mechanical connection between the two contact and sliding elements.

Clause 7. The variable speed drive of clause 6, wherein the intermediate mechanical connection of each driving member is housed in a corresponding seat of the ring.

Clause 8. The variable speed drive of clause 7, wherein each seat is configured by a through hole formed in the ring, having an axis parallel to the first rotation axis.

Clause 9. The variable speed drive of clause 6 or 7 or 8, wherein each intermediate mechanical connection comprises two components comprising each respective first mutually hinged ends and second ends; wherein the second ends of the two intermediate components are hinged each to one of the two contact and sliding elements.

Clause 10. The variable speed drive of one or more of clauses 6 to 9, wherein the two components are mutually hinged by means of a first spherical joint, and wherein each component is hinged to the respective contact and sliding element by means of a respective second spherical joint.

Clause 11. The variable speed drive of one or more of clauses 6 to 10, wherein one of said components of each mechanical connection has a toroidal or spherical surface, co-acting in sliding contact with the respective seat.

Clause 12. The variable speed drive of one or more of the preceding clauses, wherein the ring is rotatably supported in a supporting frame movable in a plane orthogonal to the first rotation axis and to the second rotation axis, the movement of the supporting frame causing a variation of the distance between the first rotation axis and the second rotation axis.

Clause 13. The variable speed drive of clause 12, wherein the supporting frame is pivoted about a pivoting axis, parallel to the first rotation axis and to the second rotation axis.

Clause 14. The variable speed drive of clause 12 or 13, wherein the device for adjusting the distance between the first rotation axis and the second rotation axis is adapted to move the supporting frame with respect to the second rotation axis.

Clause 15. The variable speed drive of clause 14, wherein the supporting frame is connected to a nut, meshing with a threaded bar, the rotation whereof causes the movement of the supporting frame.

Clause 16. The variable speed drive of one or more of clauses 12 to 15, wherein the supporting frame comprises an inner cylindrical surface, forming part of a support bearing, on which said ring is rotatably mounted.

Clause 17. The variable speed drive of one or more of the preceding clauses, wherein said ring comprises an external toothing, meshing with a motion input pinion.

Clause 18. A drive device for an assisted-pedal human-powered vehicle, comprising:
- a bottom bracket, with a pin on which cranks, levers or other members for transmitting the muscle force of a user are fitted, configured to transmit the motion to a driving sprocket, coaxial with the pin of the bottom bracket;
- a mechanical power source;
- a variable speed drive according to one or more of the preceding clauses;
- a first mechanical transmission between the mechanical power source and the ring of the variable speed drive;
- a second mechanical transmission between the variable speed drive and the driving sprocket.

Clause 19. The device of clause 18, wherein the mechanical power source is positioned coaxially to the two coaxial disks of the variable speed drive.

Clause 20. The device of clause 19, wherein the bottom bracket pin extends through the variable speed drive ring and coaxially extends through the two coaxial disks of the variable speed drive.

Clause 21. The device of one or more of clauses 18 to 20, wherein the mechanical power source comprises a drive shaft, preferably hollow, through which the pin of the bottom bracket extends, preferably coaxially.

Clause 22. The device of one or more of clauses 18 to 21, wherein the mechanical power source is an electric motor, comprising a stator and a rotor.

Clause 23. The device of clause 22, wherein the bottom bracket pin extends coaxially through the two coaxial disks of the variable speed drive and through the rotor and stator of the electric motor.

Clause 24. The device of clause 22 or 23, wherein the stator of the electric motor is external to the rotor of the electric motor and surrounds it.

Clause 25. The device of one or more of clauses 18 to 24, wherein the mechanical power source is torsionally coupled to a first toothed wheel.

Clause 26. The device of clause 25, wherein the first toothed wheel is torsionally coupled to a hollow drive shaft, in turn torsionally coupled to a rotating component of the mechanical power source (e.g., the rotor of an electric motor), and wherein the bottom bracket pin is coaxial to the hollow drive shaft.

Clause 27. The device of clause 26, wherein the mechanical power source is an electric motor and wherein the rotating component of the mechanical power source is the rotor of the electric motor.

Clause 28. The device of one or more of clauses 25 to 27, wherein the first mechanical transmission comprises a gear train between the first toothed wheel and the variable speed drive ring.

Clause 29. The device of clause 28, wherein the gear train comprises two gears coaxial and integral with each other, a first of which engages with the first toothed wheel and a second of which engages with a toothing of the variable speed drive ring.

Clause 30. The device of one or more of clauses 18 to 29, wherein a first free wheel, coaxial with the pin of the bottom bracket, is arranged between the pin of the bottom bracket and the driving sprocket.

Clause 31. The device of clause 30, wherein the second mechanical transmission comprises a second free wheel coaxial and external to the first free wheel.

Clause 32. The device of one or more of clauses 18 to 31, wherein the second mechanical transmission comprises an epicyclic gear train.

Clause 33. The device of clause 32, when depending at least on clause 31, wherein the second free wheel is interposed between a driven member of the epicyclic gear train and the driving sprocket.

Clause 34. The device of clause 32 or 33, wherein the epicyclic gear train comprises at least one planet wheel supported by one of the coaxial disks, which forms a planet carrier of the epicyclic gear train.

Clause 35. The device of clause 34, wherein said at least one planet wheel comprises:
 a first toothing meshing with a rotating toothed wheel, coaxial with the pin of the bottom bracket of the vehicle and constituting a ceding driven member of the epicyclic gear train,
 and a second toothing meshing with a fixed gear wheel, coaxial with the revolving gear wheel. Generally speaking, fixed means an integral or stationary wheel with respect to a fixed housing with respect to the vehicle frame.

Clause 36. An assisted-pedal human-powered vehicle, comprising a device of one or more of clauses 18 to 35 and a motion transmission member from the driving sprocket of the vehicle to a wheel of the vehicle.

Clause 37. The vehicle of clause 36, wherein the transmission member is a continuous transmission member, preferably a chain, a toothed belt, a drive shaft with optionally one or more joints, such as flexible couplings, cardan joints, or other.

Clause 38. The vehicle of clause 36 or 37, comprising a control unit for managing the variable speed drive.

The invention claimed is:
1. A variable speed drive comprising:
 a ring configured to rotate about a first rotation axis;
 two coaxial disks, rigidly connected to each other, the two coaxial disks being configured to rotate about a second rotation axis parallel to the first rotation axis, wherein the ring is at least partially housed between the two coaxial disks;
 a plurality of driving members, carried by the ring and arranged according to a circular arrangement coaxial to the ring, the plurality of driving members being arranged and configured to co-act with mutually opposite surfaces of the two coaxial disks, transmitting a rotation motion from the ring to the two coaxial disks;
 a device for adjusting a distance between the first rotation axis and the second rotation axis, wherein each of the plurality of driving members comprises two contact and sliding elements for contacting the mutually opposite surfaces of the two coaxial disks, and an intermediate mechanical connection between the two contact and sliding elements.

2. The variable speed drive of claim 1, wherein the intermediate mechanical connection of each of the plurality of driving members is housed in a corresponding seat of the ring.

3. The variable speed drive of claim 2, wherein each seat of each of the plurality of driving members is configured by a through hole formed in the ring, the through hole having an axis parallel to the first rotation axis.

4. The variable speed drive of claim 1, wherein each intermediate mechanical connection comprises two components, each of the two components comprising first ends mutually hinged and second ends, wherein the second end of each of the two components of the intermediate mechanical connection is hinged to one of the two contact and sliding elements.

5. The variable speed drive of claim 1, wherein two components of the intermediate mechanical connection are mutually hinged by a first spherical joint, and each of the two components is hinged to a respective contact and sliding element by a respective second spherical joint.

6. The variable speed drive of claim 1, wherein one component of each intermediate mechanical connection has a toroidal or spherical surface, co-acting in sliding contact with a respective seat.

7. The variable speed drive of claim 1, wherein the mutually opposite surfaces of the two coaxial disks are substantially flat and orthogonal to the first rotation axis and to the second rotation axis.

8. The variable speed drive of claim 1, wherein each of the plurality of driving members is held in position by at least one respective elastic element.

9. The variable speed drive of claim 1, wherein the ring is rotatably supported in a supporting frame movable in a plane orthogonal to the first rotation axis and to the second rotation axis, wherein movement of the supporting frame causes a variation of the distance between the first rotation axis and the second rotation axis.

10. The variable speed drive of claim 9, wherein the supporting frame is pivoted about a pivoting axis, parallel to the first rotation axis and the second rotation axis.

11. The variable speed drive of claim 9, wherein the device for adjusting the distance between the first rotation axis and the second rotation axis is configured to move the supporting frame with respect to the second rotation axis.

12. The variable speed drive of claim 11, wherein the supporting frame is connected to a nut, meshing with a threaded bar, wherein rotation of the threaded bar causes the movement of the supporting frame.

13. The variable speed drive of claim 1, wherein the ring comprises an external toothing, meshing with a motion input gear.

14. A drive device for an assisted-pedal human-powered vehicle, the drive device comprising:
a bottom bracket, with a pin operable by muscular force of a user, configured to transmit a motion to a driving sprocket, coaxial with the pin of the bottom bracket;
a mechanical power sources;
a variable speed drive comprising a device, a ring configured to rotate about a first rotation axis, two coaxial disks rigidly connected to each other and a plurality of driving members carried by the ring and arranged according to a circular arrangement coaxial to the ring, the two coaxial disks being configured to rotate about a second rotation axis parallel to the first rotation axis, wherein the ring is at least partially housed between the two coaxial disks, the plurality of driving members being arranged and configured to co-act with mutually opposite surfaces of the two coaxial disks, transmitting a rotation motion from the ring to the two coaxial disks, the device being configured for adjusting a distance between the first rotation axis and the second rotation axis, wherein each of the plurality of driving members comprises two contact and sliding elements for contacting the mutually opposite surfaces of the two coaxial disks, and an intermediate mechanical connection between the two contact and sliding elements;
a first mechanical transmission between the mechanical power source and the ring of the variable speed drive;
a second mechanical transmission between the variable speed drive and the driving sprocket.

15. The drive device of claim 14, wherein the mechanical power source is positioned coaxially to the two coaxial disks of the variable speed drive, and the pin extends coaxially through the two coaxial disks of the variable speed drive.

16. The drive device of claim 14, wherein the mechanical power source comprises an electric motor, the electric motor comprising a stator and a rotor, and the stator being external to the rotor and the stator surrounding the rotor.

17. The drive device of claim 16, wherein a rotating element of the mechanical power source is torsionally coupled to a first toothed wheel, wherein the first toothed wheel is torsionally coupled to a hollow drive shaft, driven in rotation by the mechanical power source, and the pin of the bottom bracket is coaxial to the hollow drive shaft, the first mechanical transmission comprising a gear train between the first toothed wheel and the ring of the variable speed drive.

18. The drive device of claim 14, wherein the second mechanical transmission comprises a first free wheel coaxial with the pin of the bottom bracket and placed between the pin of the bottom bracket and the driving sprocket, the second mechanical transmission further comprising a second free wheel coaxial and external to the first free wheel.

19. The drive device of claim 14, wherein the second mechanical transmission comprises an epicyclic gear train.

20. The drive device of claim 19, wherein a second free wheel is interposed between a driven member of the epicyclic gear train and the driving sprocket.

21. The drive device of claim 19, wherein the epicyclic gear train comprises at least one planet wheel supported by one of the two coaxial disks, which forms a planet carrier of the epicyclic gear train.

22. An assisted-pedal human-powered vehicle, comprising:
a drive device comprising:
a bottom bracket, with a pin operable by muscular force of a user, configured to transmit a motion to a driving sprocket, coaxial with the pin of the bottom bracket;
a mechanical power source;
a variable speed drive comprising a device, a ring configured to rotate about a first rotation axis, two coaxial disks rigidly connected to each other and a plurality of driving members carried by the ring and arranged according to a circular arrangement coaxial to the ring, the two coaxial disks being configured to rotate about a second rotation axis parallel to the first rotation axis, wherein the ring is at least partially housed between the two coaxial disks, the plurality of driving members being arranged and configured to co-act with mutually opposite surfaces of the two coaxial disks, transmitting a rotation motion from the ring to the two coaxial disks, the device being configured for adjusting a distance between the first rotation axis and the second rotation axis, wherein each of the plurality of driving members comprises two contact and sliding elements for contacting the mutually opposite surfaces of the two coaxial disks, and an intermediate mechanical connection between the two contact and sliding elements;
a first mechanical transmission between the mechanical power source and the ring of the variable speed drive; and
a second mechanical transmission between the variable speed drive and the driving sprocket; and
a motion transmission member from the driving sprocket to a wheel of the vehicle.

* * * * *